(12) United States Patent
Shimizu et al.

(10) Patent No.: US 8,556,023 B2
(45) Date of Patent: Oct. 15, 2013

(54) ELECTRIC POWER STEERING APPARATUS

(75) Inventors: Yasuo Shimizu, Saitama (JP); Atsuhiko Yoneda, Saitama (JP); Shigeru Yamawaki, Saitama (JP); Takehito Shiraishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 156 days.

(21) Appl. No.: 13/158,174

(22) Filed: Jun. 10, 2011

(65) Prior Publication Data

US 2011/0303480 A1 Dec. 15, 2011

(30) Foreign Application Priority Data

Jun. 11, 2010 (JP) ................................. 2010-134342

(51) Int. Cl.
*B62D 5/04* (2006.01)

(52) U.S. Cl.
USPC ........................................................ 180/444

(58) Field of Classification Search
USPC .......................................... 180/444; 384/536
See application file for complete search history.

(56) References Cited

U.S. PATENT DOCUMENTS

| | | | | |
|---|---|---|---|---|
| 2,240,285 A | * | 4/1941 | Chamberlin | 384/536 |
| 2,614,436 A | * | 10/1952 | Wahlberg | 74/490 |
| 4,895,391 A | * | 1/1990 | Groat | 280/779 |
| 5,193,917 A | * | 3/1993 | Adler et al. | 384/517 |
| 5,632,562 A | | 5/1997 | Kidzun et al. | |
| 6,474,875 B1 | * | 11/2002 | Waseda et al. | 384/582 |

FOREIGN PATENT DOCUMENTS

| | | |
|---|---|---|
| DE | 44 40 725 A1 | 5/1996 |
| GB | 2 339 610 A | 2/2000 |
| JP | 2000-225957 | 8/2000 |
| JP | 2003-019967 A | 1/2003 |
| JP | 2006-264621 A | 10/2006 |

* cited by examiner

*Primary Examiner* — Tony Winner

(74) *Attorney, Agent, or Firm* — Arent Fox LLP

(57) ABSTRACT

In an electric power steering apparatus, an elastic member, disposed between the steering shaft and the housing, configured to be elastically deformed in accordance with rotation or displacement in a vehicle width direction, of the steering shaft. At least two bearings, disposed with a gap in an axial direction of the steering shaft, are configured to support the steering shaft. The elastic member is disposed between the bearings. A supporting member may be disposed between the steering shaft and the elastic member and configured to be displaced by a rotation of a predetermined angle or predetermined distance in accordance with the rotation or a displacement, in the width direction of the vehicle, of the steering shaft with slidable support for the steering shaft. The elastic member is fixed to the supporting member and abuts the housing.

9 Claims, 17 Drawing Sheets

CW STEERING

NEUTRAL STATE

CCW STEERING

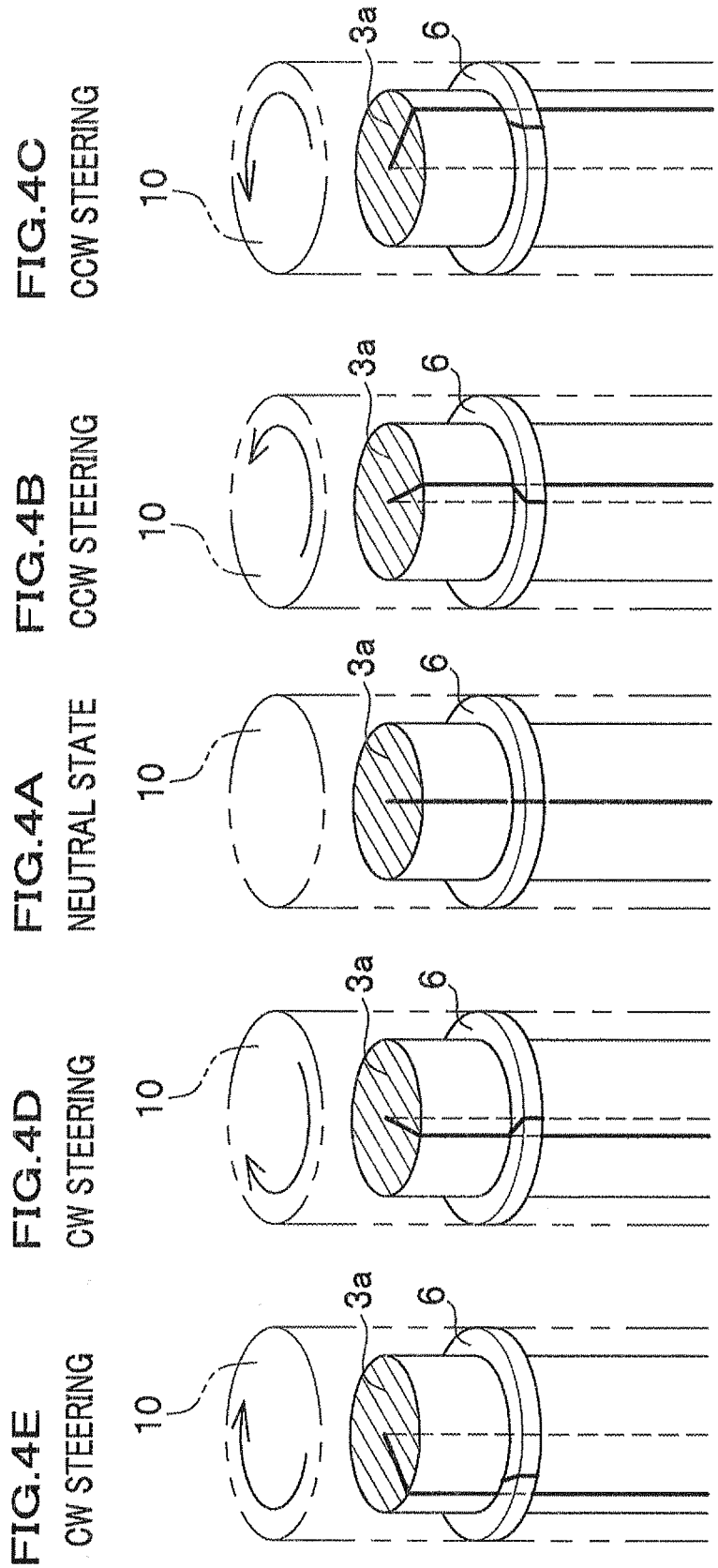

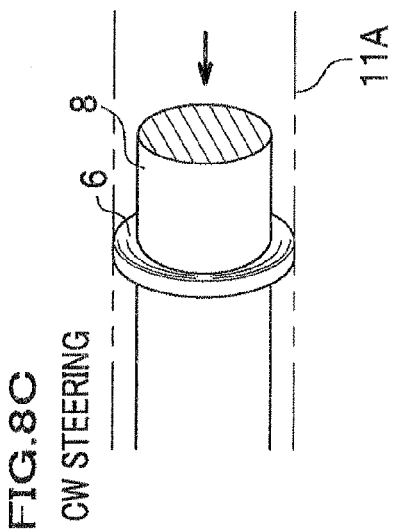
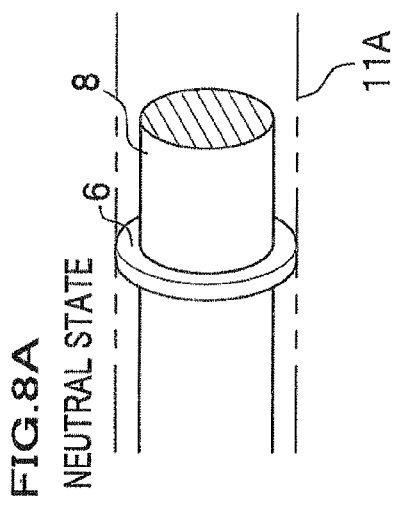
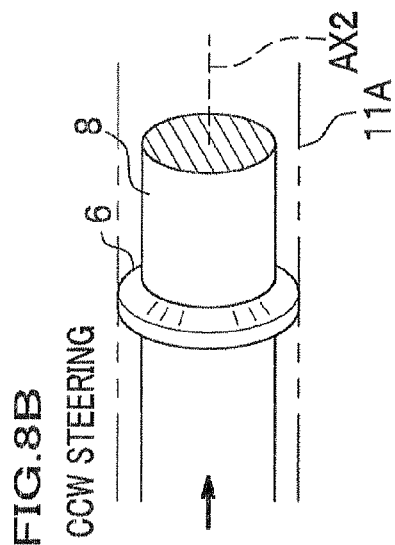
FIG.8C CW STEERING
FIG.8A NEUTRAL STATE
FIG.8B CCW STEERING

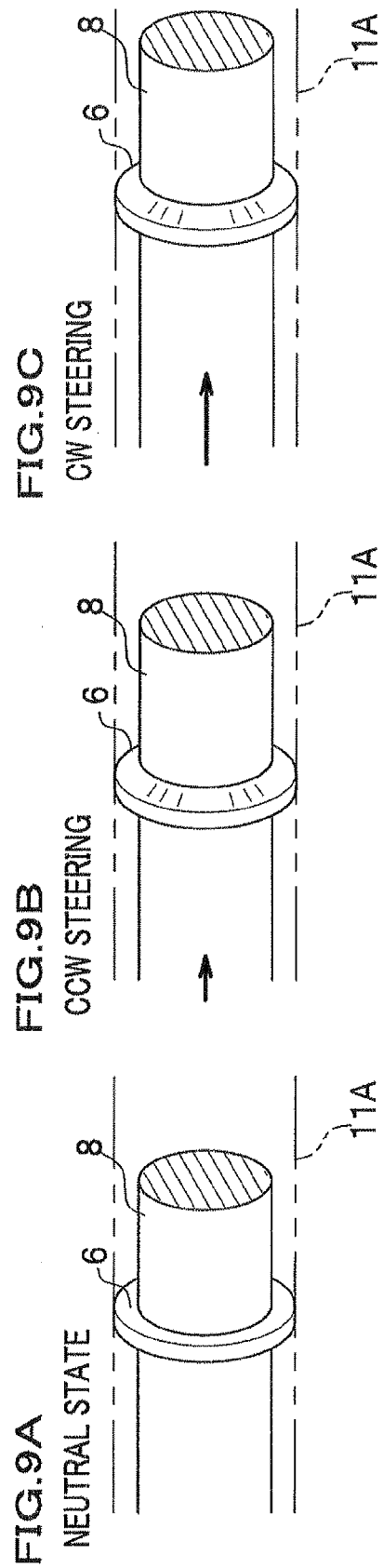

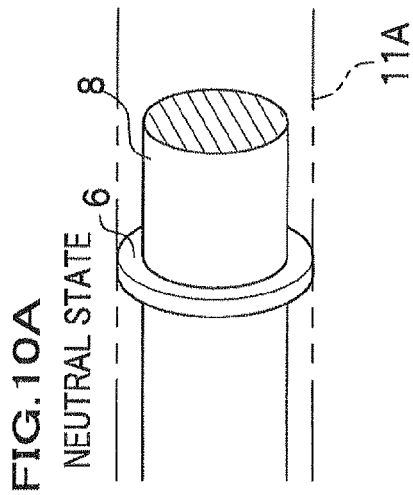
FIG.10A NEUTRAL STATE
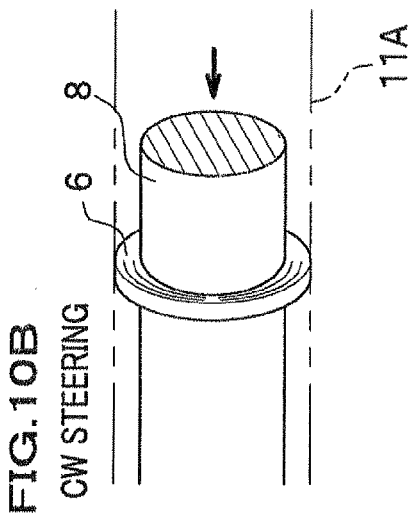
FIG.10B CW STEERING
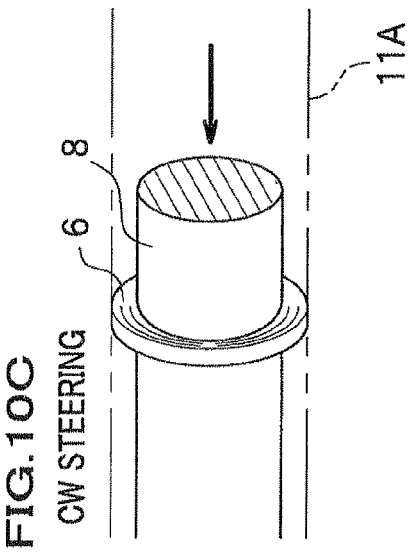
FIG.10C CW STEERING

CCW STEERING

NEUTRAL STATE

CW STEERING

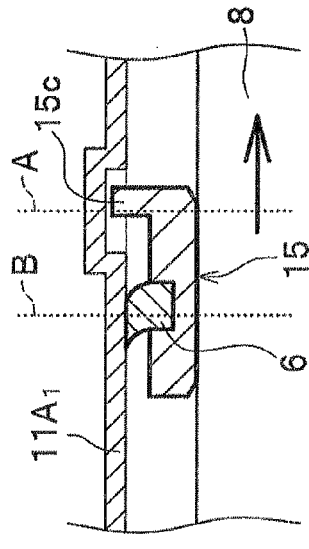
FIG.14A NEUTRAL STATE
FIG.14B CCW STEERING
FIG.14C CCW STEERING
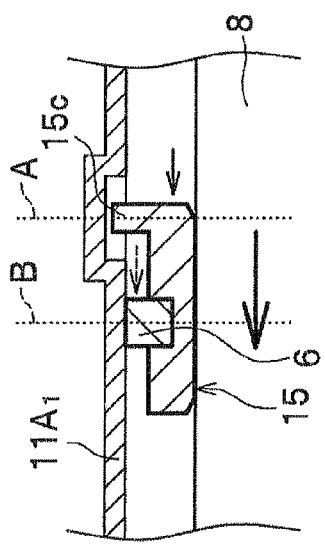
FIG.14D RETURN
FIG.14E RETURN

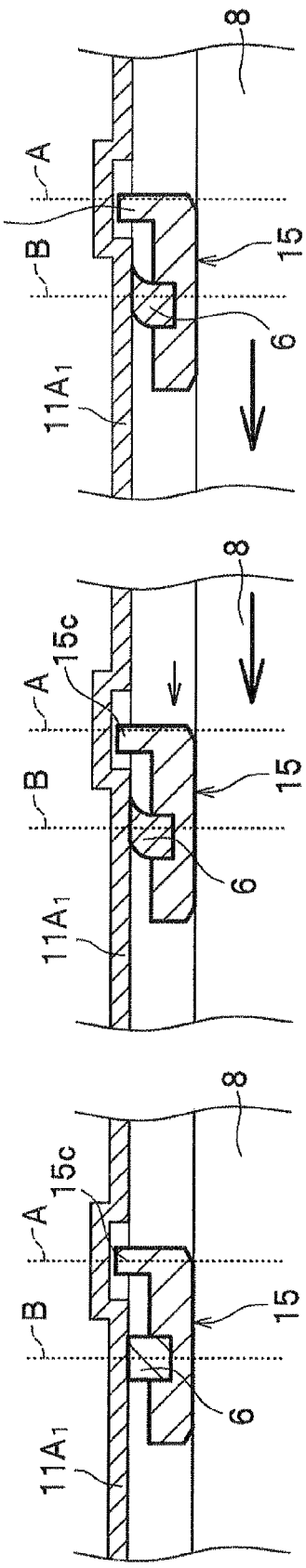
FIG.15A NEUTRAL STATE
FIG.15B CW STEERING
FIG.15C CW STEERING
FIG.15D RETURN
FIG.15E RETURN

ELECTRIC POWER STEERING APPARATUS

CROSS REFERENCE TO RELATED APPLICATION

This application claims the foreign priority benefit under Title 35, United States Code, §119(a)-(d) of Japanese Patent Application No. 2010-134342, filed Jun. 11, 2010 in the Japan Patent Office, the disclosure of which is incorporated herein by reference in its entirety. Further Japanese Patent Application No. 2011-126074, filed on Jun. 6, 2011, is co-related to Japanese Patent Application No. 2010-134342 and its disclosure is also incorporated herein by reference in its entirety.

BACKGROUND OF THE INVENTION

1. Field of the Invention

The present invention relates to an electric power steering apparatus.

2. Description of the Related Art

Electric power steering apparatuses in which a steering wheel is coupled to tires through a steering shaft are provided to reduce a steering force to be generated by a driver with an auxiliary torque, generated by an electric motor according to a magnitude of an applied steering torque. The auxiliary torque is transmitted to the steering shaft in addition to the steering force by the driver.

In automobiles having such an electric power steering apparatus, when a rotation direction of the steering wheel is switched, for example, when the steering wheel is rotated in a clockwise direction and then in a counterclockwise direction, because the steering shaft maintains the status up to now by inertia, the rotation direction cannot be changed immediately in the opposite direction. Accordingly, there is a problem of a delay in steering due to inertia of the steering shaft.

JP 2006-264621 A discloses an electric power steering apparatus including a rack shaft movable in a width direction of the vehicle, a rack housing for housing the rack shaft, first and second bearings installed between the rack shaft and the rack housing, and an elastic member, installed between the rack shaft and the rack housing, abutting the rack shaft and the rack housing. In this electric power steering apparatus, the elastic member suppresses vibrations in a radial direction of the rack shaft.

JP2003-19967 A discloses a steering apparatus for a vehicle having a steering wheel returning mechanism including a left lever and a right lever rotating with linkage with steering the steering wheel, a spring intervened between ends of the left and right levers, and a center stopper pin on which the other end of the left or the right lever abut. When the steering wheel is operated, the spring elongates until the other end of either of the left or the right lever abuts the center stop pin. After the operation of the steering wheel completes, when the steering direction of the steering wheel is switched, the steering wheel returns in the opposite direction by an amount of elongation of the spring. Accordingly, a detection value of a steering wheel angle detection unit can be equalized to a turning angle detection of steering wheels. This stops an unnecessary current flowing in the electric power steering unit to save energy.

SUMMARY OF THE INVENTION

An aspect of the present invention provides an electric power steering apparatus, including a motor generating, in accordance with a steering torque applied to a steering wheel, an assist torque transmitted to a steering shaft, for connecting the steering wheel to a tire, comprising:
 a housing configured to house the steering shaft;
 an elastic member, disposed between the steering shaft and the housing, configured to be elastically deformed in accordance with rotation or displacement in a width direction, of the steering shaft; and
 at least two bearings configured to support the steering shaft, wherein the elastic member is disposed between the bearings.

Preferably, the steering shaft comprises a steering wheel shaft, and the housing comprises a column housing configured to house the steering wheel shaft. Preferably, the elastic member is disposed between the steering wheel shaft and the column housing.

Preferably, the steering shaft comprises a rack and pinion mechanism including a rack shaft and a pinion shaft, and the housing comprises a rack housing configured to house the rack shaft. The elastic member may be disposed between the rack shaft and the rack housing. In addition, when the steering shaft means a "steering wheel shaft", displacement" is "displacement in a rotation direction". When the steering shaft means a "rack shaft", "displacement" is "displacement in a width direction of the vehicle".

According to the present invention, the elastic member may be installed between the steering shaft and the column housing. When the steering shaft rotates in response to turning the steering wheel, the elastic member is deformed in accordance with rotation displacement or displacement in the width direction of the steering shaft. When a rotation direction of the steering wheel is changed, the elastic member may restore to the original state (shape) with restoring force. The restoring force may be applied to the steering shaft, which returns the steering shaft in the opposite rotation direction such that the elastic member in the deformed state returns to the neutral state, so that a response to change in rotation direction of the steering wheel can be increased with a simple configuration.

In addition, two bearings may be installed in the housing in such a state that the bearing contact the steering shaft, and the elastic member may be installed between the bearings, so that the steering shaft is firmly supported by the bearings. Accordingly, if an external force were applied to the steering shaft, the external force may be absorbed by the bearings, so that influence to the friction at the elastic member can be excluded. As a result, the returning force that returns the steering shaft may be stable, and a preferable steering feeling may provided with a simple configuration because the friction force at the elastic member may not vary between when the external force is applied to the steering shaft and when not applied.

In addition, the annular channel may be formed in the steering shaft and have such a dimension that the elastic member is fitted thereinto, so that the elastic member can be easily attached to the steering shaft. This configuration can allow the elastic member to be easily attached to the steering shaft.

Preferably, the elastic member has a rectangular shape on the longitudinal cross section.

For example, if the elastic member is formed to have a circle or similar shape on a longitudinal cross section, a contact area of the elastic member with the steering shaft or the housing may vary between when the external force is applied to the elastic member in a radial direction and when not applied. However, the elastic member may be formed to have a rectangular shape on a longitudinal cross section, so that the contact area does not vary between when the external force is applied to the elastic member in a radial direction and when not applied, which may result in stableness in returning force applied to the steering shaft.

Preferably, the elastic member comprises a rubber member. This configuration can provide an elastic deformation to such an extent that the returning force capable of returning the steering shaft in the opposite direction is surely generated. In addition because the rubber member has an attenuation coefficient, the rubber member can attenuate vibrations from the road and variations generated at engagement in the reduction mechanism and the rack and pinion mechanism.

In addition, preferably, a torque sensor is provided in the steering shaft, and the elastic member is installed on a side of the tires from the torque sensor. This configuration may result in an accurate detection of the steering wheel torque Ts because the elastic member is not disposed between the steering wheel and the torque sensor, and a remaining torque due to a friction at the elastic member is not detected, so that the steering torque can be detected accurately. In addition, vibrations generated at engagement in the reduction mechanism and the rack and pinion mechanism can be absorbed by the elastic member, so that these variations cannot be easily detected, which may provide a higher accuracy in the torque sensor and a preferable steering feeling.

Preferably, the electric power steering apparatus further includes a supporting member, disposed between the steering shaft and the elastic member, configured to be displaced by a rotation of a predetermined angle or a predetermined distance in accordance with the rotation displacement or a displacement, in the width direction of the vehicle, of the steering shaft with slidable support for the steering shaft. The elastic member is fixed to the supporting member and abuts the housing. Accordingly, because the supporting member having the elastic member is displaced by a rotation of a predetermined angle or predetermined distance in accordance with the rotation displacement or a displacement, in the width direction of the vehicle, of the steering shaft with slidable support for the steering shaft, the elastic member can be elastically deformed and restored to the original shape when rotation direction of the steering wheel is changed. Accordingly, returning of the steering wheel is smoothly returned by the restoring force of the elastic member with a quick response. In addition, the elastic member abuts the housing as well as the supporting member provides slidable support for the steering shaft. Accordingly, the friction force between the elastic member and the housing, restricts rotation or a displacement of the supporting member in the vehicle width direction at a position after rotation of a predetermine angle and displacement of a predetermined distance in the vehicle width direction. Accordingly, the steering shaft can be rotated or displaced in the vehicle width direction while the steering shaft moves with slidable support by the supporting member. Accordingly, because the steering shaft can stably rotate and is displaced in a vehicle width direction with slidable support, the steering wheel can be stably returned. Accordingly, the vehicle can be stably controlled with a quick response steering.

Preferably, the supporting member is made of a plastic material. Accordingly the supporting member has a relative low friction coefficient, so that the steering shaft can be supported with smoothly sliding, which results in smooth rotation or displacement of the steering shaft in the vehicle width direction.

Preferably, the housing comprises a connection part where the first rack housing is connected to the second rack housing. The elastic member and the supporting member are installed near the connection part between the first rack housing and the second rack housing. Accordingly, this makes it easier to install the elastic member and the supporting member in the first rack housing in manufacturing, so that work efficiency for installing the elastic member and supporting member increases.

BRIEF DESCRIPTION OF THE DRAWINGS

The object and features of the present invention will become more readily apparent from the following detailed description taken in conjunction with the accompanying drawings in which:

FIGS. 4A to 4E are illustrations for describing a deformation in the elastic member and displacement of the steering shaft according to the first embodiment, when the steering angle is large;

FIGS. 8A to 8C illustrate deformation of the elastic member and displacement of the rack shaft when the steering angle is small according to the second embodiment, wherein FIG. 8A shows a neutral state, FIG. 8B shows a status in which the rack shaft shifts from the neutral state to the left direction in response to a torque as a result of a counterclockwise rotation of the steering wheel and FIG. 8C shows a status in which the rack shaft shifts from the neutral state to the right direction in response to a torque as a result of a clockwise rotation of the steering wheel;

FIGS. 9A to 9C illustrate deformation of the elastic member and displacement of the rack shaft during a counterclockwise steering when the steering angle is large, wherein FIG. 9A shows a neutral state, and FIGS. 9B and 9C show statuses in which the rack shaft shifts from the neutral state to the left direction in response to a torque as a result of a counterclockwise rotation of the steering wheel;

FIGS. 10A to 10C illustrate deformation of the elastic member and displacement of the rack shaft in the right direction during a clockwise steering from a neutral state when the steering angle is large;

FIGS. 13A to 13C illustrate displacement of the elastic member and the supporting member when the steering angle is small, wherein FIG. 13A shows a neutral status, FIG. 13B shows a state in which the rack shaft shifts from a neutral position to the left direction in response to a counterclockwise, and FIG. 13C shows a status in which the rack shaft shifts from the neutral state to the right direction in response to a clockwise steering torque;

FIGS. 14A to 14C illustrate deformation of the elastic member and displacement of the rack shaft when the steering angle is small according to the second embodiment, wherein FIG. 14A shows a neutral state, FIGS. 14B and 14C show statuses in which the rack shaft shifts from the neutral state to the left direction in response to a torque as a result of a counterclockwise rotation of the steering wheel and FIGS. 14D and 14E show statuses in which the rack shaft returns to the neutral state from the status in which the rack shaft has shifted to the left direction, in response to release of a counterclockwise rotation of the steering wheel;

FIGS. 15A to 15C illustrate deformation of the elastic member and displacement of the rack shaft when the steering angle is small according to the second embodiment, wherein FIG. 15A shows a neutral state, FIGS. 15B and 15C show statuses in which the rack shaft shifts from the neutral state to the right direction in response to a torque as a result of a clockwise rotation of the steering wheel and FIGS. 15D and 15E show statuses in which the rack shaft returns to the neutral state from the status in which the rack shaft has shifted to the right direction, in response to release of a clockwise rotation of the steering wheel;

DETAILED DESCRIPTION OF THE INVENTION

Prior to describing an embodiment of the present invention, the above-mentioned related art will be further argued.

In the technology disclosed in JP2006-264621 A, a predetermined gap is provided between the rack shaft and the first and second bearings, so that the first and second bearings do not support the rack shaft. Accordingly, when an external force is applied to the rack shaft from an outside of the first and second bearings, influence of the external force directly reach the elastic member. Therefore, the elastic member elastically deforms in a radial direction, so that a friction force of the elastic member generated when the rack shaft moves in the vehicle width direction varies. In other words, a problem is that a force returning the rack shaft in the opposite direction is unstable, so that a feeling in steering the steering wheel becomes worse because the friction force of the elastic member varies between when the external force is applied to the rack shaft and when not applied.

In the technology disclosed in JP2003-19967 A, a problem is that a load in steering the steering wheel varies between steering from when the left lever or the right lever hits the center stopper pin and steering after the left lever or the right lever hits the center stopper pin, so that steering feeling varies from light feeling to heavy feeling as well as the steering feeling becomes worse because the left lever or the right lever hits the center stopper pin. In addition, the steering wheel return mechanism disclosed in JP2003-19967 A has a problem of increase in the number of parts and a manufacturing cost due to a complicated mechanism because the steering wheel return mechanism is formed with the left lever, the right lever, a spring, the center stop pin, and the like.

The present invention is developed in consideration of these circumstances and provides an electric power steering apparatus capable of providing a preferable steering feeling in addition to an improved response in switching of the turning direction of the steering wheel with a simple configuration.

The electric power steering apparatus according to the present invention provides a preferable steering feeling with a higher responsibility in switching the direction of turning the steering wheel with a simple configuration. In addition, a detection accuracy of a torque sensor 1 can be increased, so that a preferable steering feeling is provided.

With reference to drawings will be described embodiments of the present invention in detail.

The same element or parts are designated with the same or like reference, and thus, a duplicated description will be omitted.

First Embodiment

Figure 1:
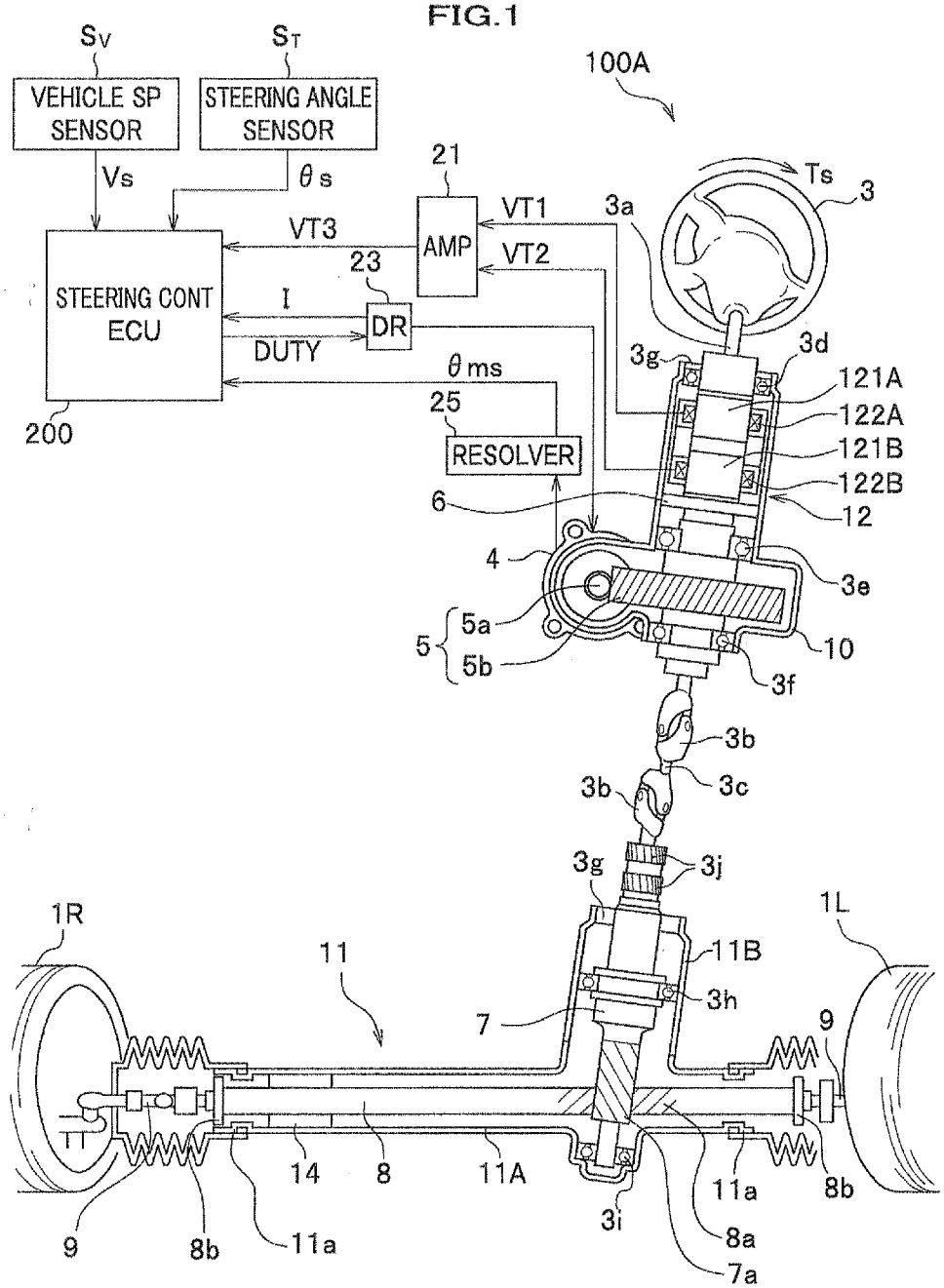
FIG. 1 shows a configuration of the electric power steering apparatus according to a first embodiment.

FIG. 1 is a block diagram of an electric power steering apparatus according to a first embodiment of the present invention.

As shown in FIG. 1, an electric power steering apparatus 100A is an assist device for assisting steering with a steering wheel 3 to turn tires (front wheels) 1R, 1L using an electric motor 4.

In the electric power steering apparatus 100A, a steering wheel shaft $3a$ is provided with a steering wheel 3 at an upper end thereof, a shaft $3c$, and a pinion shaft 7, which shafts are connected with two universal joints $3b$, $3b$. A pinion gear $7a$ installed at a lower end of the pinion shaft 7 is engaged with a rack gear $8a$ on a rack shaft 8 capable of reciprocating motion in a vehicle width direction (movable in an axial direction), and both ends of the rack shaft 8 are connected to the right and left tires 1R, 1L through tie rods 9, 9. With this configuration, the electric power steering apparatus 100A can change a traveling direction of the vehicle when the steering wheel 3 is turned. The rack shaft 8, the rack gear $8a$, the tie rods 9, 9 form a turning mechanism. The pinion shaft 7 and the rack shaft 8 forms a rack and pinion mechanism.

As shown in FIG. 1, the steering wheel shaft $3a$ serving as a steering shaft is housed in a column housing 10 to be rotatably supported about the axis thereof in which an upper part, an intermediate part, and a lower part of the column housing 10 are rotatably supported by bearing $3d$, $3e$, and $3f$ respectively. The steering wheel shaft $3a$ is provided with a seal member $3g$ on an upper side of the bearing $3d$ to seal a space between the steering wheel shaft $3a$ and the column housing 10. In addition the steering wheel shaft $3a$ is provided with a torque sensor 12 and an elastic member 6.

The torque sensor 12 detects a steering wheel torque Ts generated on the steering wheel shaft $3a$ connected to the steering wheel 3 by a driver's operation of the steering wheel 3. The torque sensor 12 includes a first magnetostriction film 121A, a second magnetostriction film. 121B, which are formed around an entire circumference of the steering wheel shaft $3a$, a first detection coil 122A disposed around an outer face of the first magnetostriction film 121A with a predetermined gap, and a second detection coil 122B disposed around an outer face of the second magnetostriction film 121B with a predetermined gap.

The first magnetostriction film 121A and the second magnetostriction film 121B comprise a magnetostriction member having a positive magnetostriction constant such as an Fe—Ni system or an Fe—Cr system and are disposed along the axial direction of the steering wheel shaft 3a with a gap. The first magnetostriction film 121A and the second magnetostriction film 121B are caused to have anisotropies in opposite direction and are formed to have a predetermined film thicknesses (for example, not greater than 30 µm) by, for example, a plating method or an evaporation method.

When the driver turns the steering wheel 3, a steering wheel torque Ts is generated and transmitted to the steering wheel shaft 3a. The transmitted steering wheel torque Ts is detected by the torque sensor 12 and outputted as detection signals, wherein the first detection coil 122A outputs a signal voltage VT1 and the second detection coil 122B outputs a signal voltage VT2. The signal voltages VT1 and VT2 outputted by the first detection coil 122A and the second detection coil 122B are amplified by a differential amplifier 21 and inputted into a steering control ECU 200 as a torque signal VT3.

Figure 2:
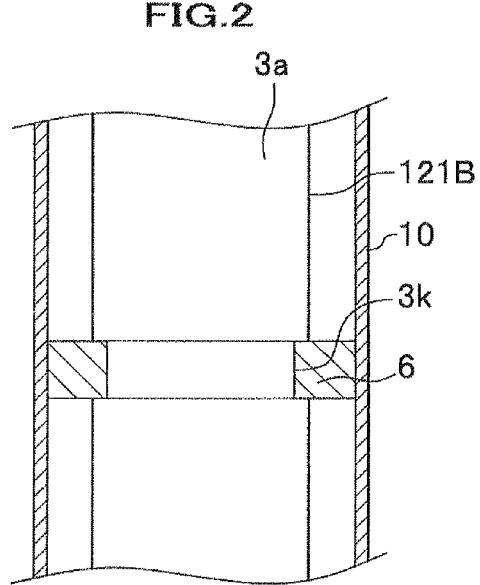
FIG. 2 is a partial enlarged longitudinal cross section view of a part of the electric power steering apparatus shown in FIG. 1 around an elastic member.

FIG. 2 is an enlarged longitudinal cross section of a part of the electric power steering apparatus around an elastic member 6, taken along (in parallel to) the axis AX1 (shown in FIG. 3C) of the steering wheel shaft 3a.

As shown in FIG. 2, the elastic member 6 capable of being elastically deformed is fitted into an annular channel 3k formed in an outer circumferential surface of the steering wheel 3a to be mounted on the steering wheel shaft 3a. The elastic member 6 having a rectangular shape on the longitudinal cross section is a member for applying to the steering wheel shaft 3a a force returning the steering wheel shaft 3a in an opposite direction (to a neutral position) when a turning direction of the steering wheel is switched.

The elastic member 6 comprises, for example, a rubber member, or a spring member and is provided between the steering wheel shaft 3a and the column housing 10 in such a state that an outer circumference of the elastic member 6 contacts an inner surface of the column housing 10. The elastic member 6 is installed between the steering wheel shaft 3a and the column housing 10 with a suitable pressure (compression state). For example, a dimension of the elastic member 6 in radial direction of the steering wheel shaft 3a is made slightly greater than a distance between the steering wheel shaft 3a and the column housing 10 to provide the pressure.

The elastic member 6 is mainly deformed by the pressure with an elastic deforming quantity in accordance with the pressure. More specifically, the greater the pressure becomes, the greater the elastic deformation quantity becomes, and the smaller the pressure becomes, the smaller the elastic deformation quantity becomes. The pressure can be controlled by adjusting a shape of the elastic member 6, or the distance between the steering wheel shaft 3a and the column housing 10.

Returning to FIG. 1, the elastic member 6 is installed on a side of the tires 1R, 1L from the torque sensor 12 and between the bearings 3d and 3e. The bearings 3d, 3e are disposed in the column housing 10 with a gap in a direction of the axis AX1 of the steering wheel 3a and contact an outer circumferential surface of the steering wheel shaft 3a. In this embodiment, the bearings 3d, 3e rotatably support the steering wheel shaft 3a, i.e., the steering shaft.

The pinion shaft 7 is housed in a steering gear box 11 to be rotatably supported about an axis thereof in which an intermediate part and a lower part of the pinion shaft 7 are rotatably supported by bearing 3h, 3i respectively. The pinion shaft 7 is provided with fastening parts 3j, 3j for connecting the universal joint 3b thereto. The pinion shaft 7 is provided with a seal member 3g to seal a space between the pinion shaft 7 and the steering gear box 11. The steering gear box 11 include a rack hosing 11A for housing and holding the rack shaft 8 and a lid part 11B for housing and holding the pinion shaft 7.

The rack shaft 8 is provided at both ends thereof with rack ends 8b, 8b and the rack housing 11A is provided at both end thereof with housing ends 11a, 11a. In the rack housing 11A, installed are the pinion gear 7a, the rack shaft 8, a shaft bearing 3i, and a sliding bearing 14 which contacts and slidably holds the rack shaft 8.

The electric motor 4 is a device for supplying an auxiliary steering force for reducing a steering force applied to the steering wheel 3. A worm gear 5a provided on the output shaft of the electric motor 4 is geared with a worm wheel gear 5b mounted on the steering wheel shaft 3a. In other words, the worm gear 5a and the worm wheel gear 5b form a reduction mechanism (an auxiliary torque transmission mechanism) 5. A rotor (not shown) of the electric motor 4, the worm gear 5a connected to the electric motor 4, the worm wheel gear 5b, the pinion shaft 7, the rack shaft 8, the rack gear 8a, and the tie rods 9, 9, etc. form a steering system.

The electric motor 4 is a three-phase brushless motor having a stator (not shown) and the rotor (not shown) rotating inside the stator to transform an electric power into a mechanical power ($P_M = \omega_M T_M$).

The term $\omega_M$ represents an angular velocity of the electric motor 4 and the term $T_M$ represents a generation torque of the electric motor 4. A steering wheel torque applied to the steering wheel 3 is assumed as Ts; an assist quantity assisted by a torque from the reduction mechanism 5 which boosts a torque $T_M$ generated by the electric motor 4 is assumed as $A_H$; and a coefficient of the assist quantity is assumed as $k_A(VS)$ varying as a function of, for example, a vehicle speed VS. In this case, because $A_H = k_A(VS) \times Ts$, a steering torque Th applied to the steering wheel shaft 3a is given by:

$$Th = Ts + A_H = Ts + k_A(VS) \times Ts \tag{1}$$

Thus, the steering wheel torque Ts is given by:

$$Ts = Th/(1 + k_A(VS)) \tag{2}$$

Accordingly the steering wheel torque Ts is reduced to be $1/\{1+k_A(VS)\}$ times the steering torque Th (load). For example, if $k_A(0)=2$, when the vehicle speed VS=0, the steering wheel torque Ts is controlled to be ⅓-times as light as the steering torque Th. If $k_A(100)=0$, when the vehicle speed VS=100, the steering wheel torque Ts becomes equal to the steering torque Th, so that a reaction torque responsive to the steering wheel torque is controlled to be that in the manual steering, which provides a surer steering torque feeling. In other words, the steering wheel torque Ts is controlled in accordance with the vehicle speed VS, so that a stable reaction torque feeling can be provided such that the reaction torque is low when the vehicle speed is low and is steady when the vehicle speed is high.

The electric power steering apparatus 100A includes a motor driving circuit 23 for driving the electric motor 4, a resolver 25 for detecting a rotation angle of the electric motor 4 and generating a rotation angle signal $\theta_m$, a differential amplifying circuit 21 for amplifying the outputs from the torque sensor 12 and generating a torque signal VT3, a steering angle sensor $S_T$ for detecting a steering angle of the steering wheel 3 and generating a steering angle signal $\theta_S$, a vehicle speed sensor $S_V$ for detecting a speed of a vehicle (vehicle speed VS), and a steering control ECU (Electric Control Unit) 200 for driving and controlling the electric motor 4.

The motor driving circuit 23 includes a plurality of switching elements such as a three-phase FET bridge circuit and generates voltage square waves using a DUTY signal (DUTY U, DUTY V, DUTY W) from the steering control ECU 200 to drive the electric motor 4. The motor driving circuit 23 has a function of detecting three phase motor currents I (IU, IV, IW) with Hall elements (not shown).

The vehicle speed sensor $S_v$ detects the vehicle speed VS of the vehicle as the number of pulses per unit time period.

The steering control ECU 200 includes a computer having a CPU (Central Processing Unit), a ROM (Read Only Memory), and a RAM (Random Access Memory) and generates a DUTY signal applied to the motor driving circuit 23 to drive the electric motor 4 to have a generation torque $T_M$ by the electric motor 4 using the three phase motor currents I from the motor driving circuit 23, the rotation angle signal $\theta_{mS}$ from the resolver 25, the vehicle speed signal Vs from the vehicle speed sensor $S_v$, the steering angle signal $\theta_S$, and the torque signal VT3 from the differential amplifying circuit 21. In accordance with the DUTY signal the motor driving circuit 23 drives the electric motor 4 with the generation torque $T_M$.

The electric power steering apparatus 100A according to a first embodiment of the present invention is configured as described above basically and will be described an operation and advantageous effects.

Figure 3C:
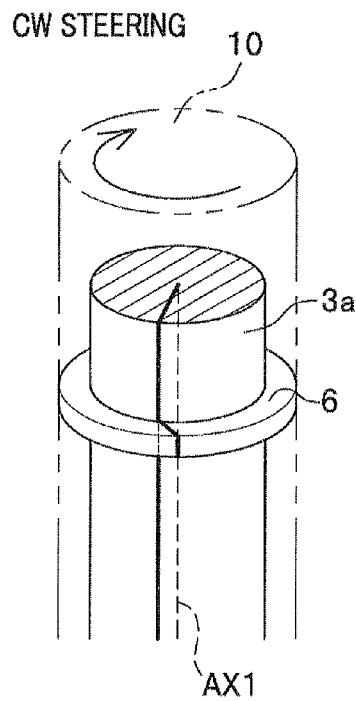
FIGS. 3A to 3C are illustrations for describing a deformation in the elastic member and displacement of the steering shaft according to the first embodiment, when a steering angle is small.
Figure 3A:
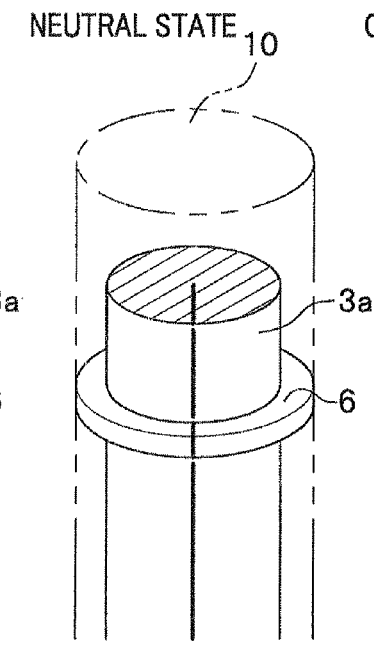
Figure 3B:
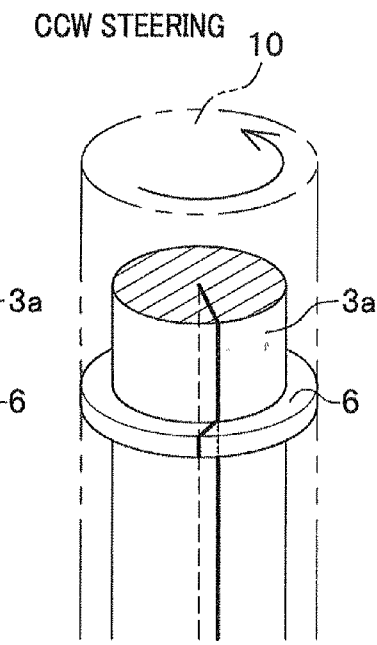

With reference to FIGS. 3A to 3C, will be described the elastic member and displacement of the steering shaft when the steering angle is small. In the description below, the case where the steering angle is small is a steering state while the elastic member is being elastically deformed. The case where the steering angle is large is a steering status in which the elastic member is not deformed over a predetermined deformation quantity.

FIGS. 3A to 3C are illustrations for describing a deformation in the elastic member 6 and displacement of the steering wheel shaft 3a. FIG. 3A shows a neutral state, FIG. 3B shows a counterclockwise rotation state in which the steering wheel shaft 3a rotates counterclockwise from the neutral state when a counterclockwise steering torque is applied, and FIG. 3C shows a clockwise rotation state in which the steering wheel shaft 3a rotates clockwise from the neutral state when a clockwise steering torque is applied.

As shown in FIGS. 3A and 3B, when the steering wheel 3 (see FIG. 1) is rotate counterclockwise, the steering wheel shaft 3a rotates counterclockwise, and the elastic member 6 disposed between the steering wheel shaft 3a and the column housing 10 is elastically deformed in accordance with rotation of the steering wheel shaft 3a. More specifically, the elastic member 6 is installed between the steering wheel shaft 3a and the column housing 10 with pressure (due to a larger dimensions than the distance between the steering wheel shaft 3a and the column housing 10) and has a friction between the column housing 10 and an outer circumferential surface thereof. Because the elastic member 6 is fitted into the annular channel 3k, the elastic member 6 as the whole does not rotate, but elastically deformed.

When the steering wheel torque Ts applied to the steering wheel 3 is released from this state, the elastic member 6 restores to the original state (a shape in the neutral state as shown in FIG. 3A). The restoring force is applied to the steering wheel shaft 3a, which returns the steering shaft in the opposite rotation direction such that the elastic member 6 in the deformed state returns to the neutral state, so that the steering wheel shaft 3a is returned toward the neutral state, and the steering wheel 3 is also returned toward the neutral state.

When the steering wheel 3 is turned clockwise as shown in FIGS. 3A and 3C, the steering wheel shaft 3a and the steering wheel 3 are returned toward the neutral position because of the same theory as the case described above, and thus a detailed description is omitted.

With reference to FIGS. 4A to 4E will be described deformation of the elastic member 6 and displacement of the steering wheel shaft 3a.

FIGS. 4A to 4E are illustrations for describing the elastic member 6 and displacement of the steering wheel shaft 3a. FIG. 4A shows a neutral state, FIGS. 4B and 4C show counterclockwise rotation states in which the steering wheel shaft 3a rotates counterclockwise from the neutral state when a counterclockwise steering torque is applied, and FIGS. 4D and 4E show clockwise rotation states in which the steering wheel shaft 3a rotates clockwise from the neutral state when a clockwise steering torque is applied.

As shown in FIGS. 4A and 4B, when the steering wheel 3 is turned counterclockwise, the steering wheel shaft 3a turns counterclockwise, and the elastic member 6 installed between the steering wheel shaft 3a and the column housing 10 is elastically deformed in accordance with rotation of the steering wheel shaft 3a.

After that, when the steering wheel 3 is turned at a steering angle not smaller than a predetermined steering angle, the elastic member is not deformed over a predetermined deformation quantity and a slip occurs such that the elastic member 6 relatively slips on the steering wheel shaft 3a and the column housing 10. More specifically, until the steering wheel 3 reaches the predetermined steering angle the elastic member 6 is being deformed in accordance with the rotation of the steering wheel shaft 3a. When the steering wheel 3 reaches the predetermined steering angle, the elastic member 6 is not further deformed with a constant deformation quantity and rotates together with the steering wheel shaft 3a.

When the steering wheel torque Ts applied to the steering wheel 3 is released in this state, the elastic member 6 restores to the original state (a shape in the neutral state as shown in FIG. 4A). The restoring force is applied to the steering wheel shaft 3a, which returns the steering shaft in the opposite rotation direction such that the elastic member 6 in the deformed state returns to the neutral state, so that the steering wheel shaft 3a is returned toward the neutral state, and the steering wheel 3 is also returned toward the neutral state.

When the steering wheel 3 is turned clockwise as shown in FIGS. 4A, 4D, and 4E, the steering wheel shaft 3a and the steering wheel 3 are returned toward the neutral position because of the same theory as the case where the steering wheel 3 are turned counterclockwise with a steering angel not smaller than a predetermined steering angle, and thus a detailed description is omitted.

According to the first embodiment as described above, the elastic member 6 is installed between the steering wheel shaft 3a and the column housing 10 in such a state that the elastic member 6 contacts the steering wheel shaft 3a and the column housing 10. When the steering wheel shaft 3a rotates in response to turning the steering wheel 3, the elastic member is deformed in accordance with rotation of the steering wheel shaft 3a. When a rotation direction of the steering wheel 3 is changed, the elastic member 6 restores to the original state with restoring force. The restoring force is applied to the steering wheel shaft 3a, which returns the steering wheel shaft 3a in the opposite rotation direction such that the elastic member 6 in the deformed state returns to the neutral state, so that a response to change in rotation direction of the steering wheel 3 can be increased.

In addition, two bearings 3d, 3e are installed in the column housing 10 in such a state that the bearing 3d, 3e contact the steering wheel shaft 3a, and the elastic member 6 is installed between the bearings 3d, 3e, so that the steering wheel shaft 3a is firmly supported by the bearings 3d, 3e. Accordingly, if an external force were applied to the steering wheel shaft 3a, the external force is absorbed by the bearings 3d, 3e, so that influence to the friction at the elastic member 6 can be excluded. As a result, the returning force that returns the steering wheel shaft 3a is stable, and a preferable steering feeling is provided with a simple configuration because the friction force at the elastic member 6 does not vary between when the external force is applied to the steering wheel shaft 3a and when not applied.

In addition the annular channel 3k formed in the steering wheel shaft 3a has such a dimension that the elastic member 6 is fitted thereinto, so that the elastic member 6 can be easily attached to the steering wheel shaft 3a.

If the elastic member 6 is formed to have a cross section in a circle or similar shape, a contact area of the elastic member 6 with the steering wheel shaft 3a or the column housing 10 varies between when the external force is applied to the elastic member 6 in a radial direction and when not applied. On the other hand, the elastic member 6 is formed to have a rectangular shape on the longitudinal cross sectional, so that the contact area does not vary between when the external force is applied to the elastic member 6 in a radial direction and when not applied, which results in stable returning force applied to the steering wheel shaft 3a.

The elastic member 6 may comprise a rubber member. This configuration can provide an elastic deformation to such an extent that the returning force capable of returning the steering wheel shaft 3a in the opposite direction is surely generated. In addition because the rubber member has an attenuation coefficient, the rubber member can attenuate vibrations from the road and variations generated at engagement in the reduction mechanism 5 and the rack and pinion mechanism.

In addition, the elastic member 6 is installed on a side of the tires 1R, 1L from the torque sensor 12, so that the torque sensor 12 does not detect a remaining torque due to the friction force at the elastic member 6, which results in an accurate detection of the steering wheel torque Ts. Further, the elastic member 6 can absorb variation in engaging extents in the reduction mechanism 5 and the rack and pinion mechanism, so that a detection accuracy of the torque sensor 12 can be improved because the variation is not easily detected, which results in a preferable steering feeling.

Second Embodiment

Figure 5:
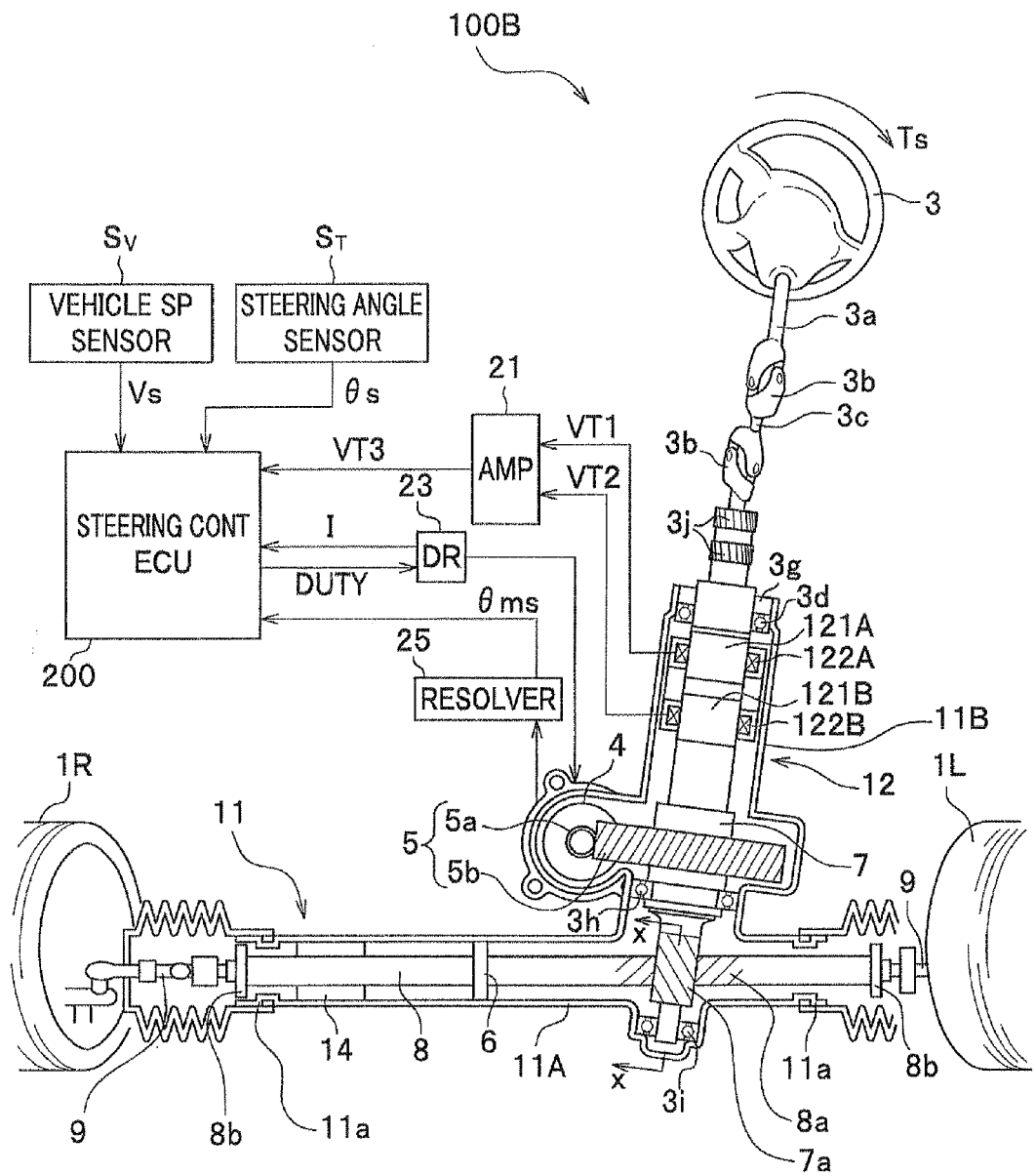
FIG. 5 shows a configuration of the electric power steering apparatus according to a second embodiment.

With reference to FIG. 5 will be described an electric power steering apparatus according to the second embodiment of the present invention. In the description of the second embodiment, points different from the first embodiment will be described in detail, but a duplicated description for the same or corresponding parts will be omitted.

FIG. 5 is a block diagram of an electric power steering apparatus according to a second embodiment of the present invention.

The electric power steering apparatus according to a second embodiment is different from that of the first embodiment in that the elastic member 6 is installed between the rack shaft 8 and the rack housing 11A.

In addition, the electric power steering apparatus according to the second embodiment is different from that of the first embodiment in that the electric motor 4 drives the pinion shaft 7 via the reduction mechanism 5 configured with the worm gear 5a and the worm wheel gear 5b and in that the column housing 10 is omitted by housing the reduction mechanism 5 and the torque sensor 12 are housed in the lid part 11B of the steering gear box 11.

Because the arrangement of the reduction mechanism 5 is different from the first embodiment, the rack housing 11A and the lid part 11B in the steering gear box 11 have different shapes from those in the first embodiment. However, these functions are the same.

In the first embodiment, "displacement" is of "rotation direction". However, in the second embodiment, "displacement" is of "vehicle width direction".

Figure 6:
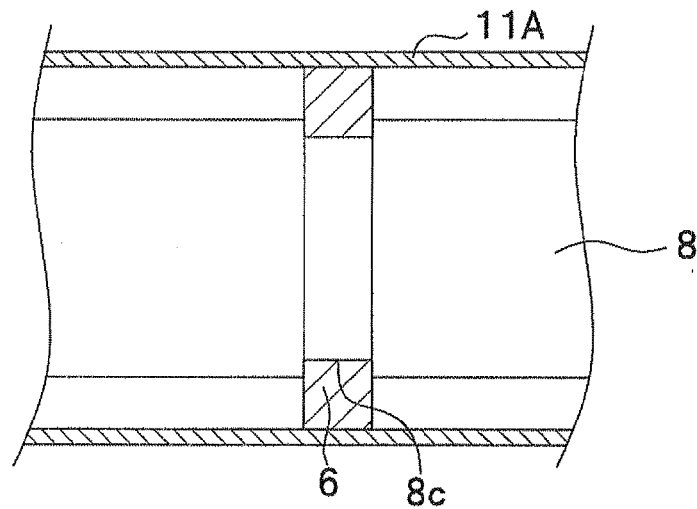
FIG. 6 is a partial enlarged longitudinal cross section view of a part of the electric power steering apparatus shown in FIG. 5 around an elastic member.

FIG. 6 is a longitudinal cross section view for describing a mechanism around the elastic member in the electric power steering apparatus shown in FIG. 5.

The rack shaft 8 as the steering shaft has an annular channel 8c formed in an outer circumferential surface of the rack shaft 8 into which an elastic member 6 capable of being elastically deformed is fitted as shown in FIG. 6. The elastic member is a member for applying a returning force to the rack shaft 8 in the opposite direction when a rotation direction of the steering wheel 3 is changed and formed to have a rectangular shape on a longitudinal cross section in parallel to (or including) an axis AX2 of the rack shaft 8 (see FIG. 8B).

The elastic member 6 comprises, for example, a rubber member, or a spring member and is provided between the rack shaft 8 and the rack housing 11A in such a state that an outer circumference of the elastic member 6 contacts an inner surface of the rack housing 11A. The elastic member 6 is installed between the rack shaft 8 and the rack housing 11A with a suitable pressure. For example, a dimension in radial direction of the rack shaft 8 of the elastic member 6 is made slightly greater than a distance between the rack shaft 8 and the rack housing 11A to provide the pressure.

Returning to FIG. 5, the elastic member 6 is installed on a same side of the torque sensor 12 as the tires 1R, 1L and between the sliding bearing 14 and the rack gear 8a engaging with the pinion gear 7a.

Figure 7:
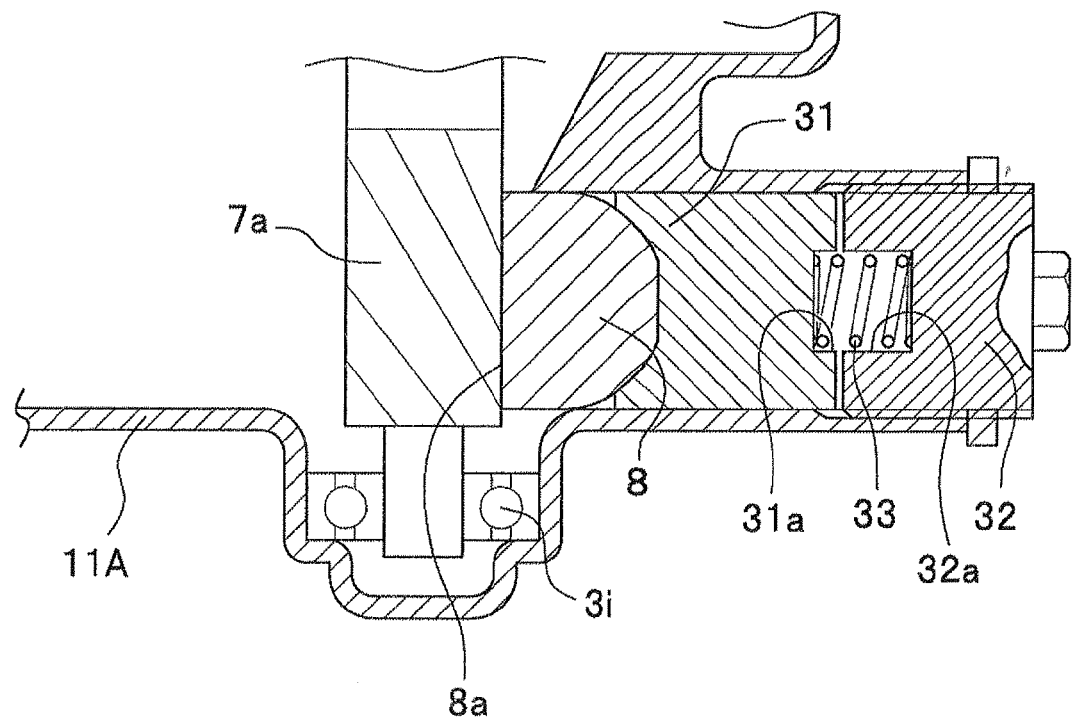
FIG. 7 is a cross section view taken along X-X in FIG. 5.

FIG. 7 is a cross section view taken along X-X line in FIG. 5.

As shown in FIG. 7, the rack shaft 8 is slidably supported by a rack guide 31 in left and right directions. The rack guide 31 is pressurized toward the pinion gear 7a by a spring 33 so as to abut a back face of the rack shaft 8 (a face opposite to a face in which the rack gear 8a is formed). This configuration provides a preferable engagement between the rack gear 8a and the pinion gear 7a with allowing the rack shaft 8 to bend. The spring 33 is disposed between a hollow part 31a formed in the rack guide 31 and a hollow part 32a formed in a nut member 32.

Returning to FIG. 5, the slide bearing 14 and the pinion gear 7a are installed in the rack housing 11A with a gap in an axial direction of the rack shaft 8. The slide bearing 14 abuts an outer circumferential surface of the rack shaft 8. The pinion gear 7a is engaged with the rack gear 8a formed in an outer circumferential surface of the rack shaft 8 in corporation with the rack guide 31. The pinion gear 7a also serves as a bearing in addition to the slide bearing 14, and the rack shaft 8 corresponds to the steering shaft in the first embodiment regarding that the elastic member 8 is provided.

The electric power steering apparatus 100B according to the second embodiment of the present invention is basically configured as described above. Next will be described the operation and an advantageous effect.

With reference to FIG. 8, will be described deformation of the elastic member 6 and displacement of the rack shaft 8 when the steering angle is small.

FIGS. 8A to 8C illustrate deformation of the elastic member 6 and displacement of the rack shaft 8 when the steering angle is small. FIG. 8A shows a neutral state, FIG. 8B shows a state in which the rack shaft 8 is shifted in a left direction from the neutral state as a result of receiving a counterclockwise steering torque. FIG. 8C shows a state in which the rack shaft 8 is shifted in a right direction from the neutral state as a result of receiving a clockwise steering torque.

As shown in FIGS. 8A and 8B, when the driver turns the steering wheel 3 (see FIG. 5) counterclockwise, the rack shaft 8 shifts in a right direction in FIG. 8, and the elastic member 6 disposed between the rack shaft 8 and the rack housing 11A is elastically deformed in accordance with the shift of the rack shaft 8. More specifically, because the elastic member 6 is installed between the rack shaft 8 and the rack housing $11A_1$ with the pressure, the elastic member does not move but is elastically deformed even if the rack shaft 8 shifts. More specifically, the elastic member 6 is installed between the rack shaft 8 and the rack housing 11A with a suitable pressure. For example, a dimension in radial direction of the rack shaft 8 of the elastic member 6 is made slightly greater than a distance between the rack shaft 8 and the rack housing 11A to provide the pressure. Accordingly, though the rack shaft 8 shifts, the elastic member 6 does not shift, but is elastically deformed (a contact surface side of the elastic member 6 with the rack shaft slightly shifts as deformation).

When the steering wheel torque Ts (see FIG. 5) applied to the steering wheel 3 is released in this state, the elastic member 6 restores to the original state (a shape in the neutral state as shown in FIG. 8A).

When the steering wheel torque Ts applied to the steering wheel 3 is released in this state, the elastic member 6 restores to the original state (a shape in the neutral state as shown in FIG. 3A).

When the steering wheel 3 is turned clockwise as shown in FIGS. 8A and 8C, the steering wheel shaft 3a and the steering wheel 3 are returned toward the neutral position because of the same theory as the case described above, and thus a detailed description is omitted.

With reference to FIGS. 9A to 9C and FIGS. 10A to 10C will be described deformation of the elastic member 6 and displacement of the rack shaft 8 when the steering angle is large.

FIGS. 9A to 9C are illustrations for describing the elastic member 6 and displacement of the rack shaft 8 when the steering angle is large. FIG. 9A shows a neutral state, FIGS. 9B and 9C show that the rack shaft 8 shifts in a left direction from the neutral state when a counterclockwise steering torque is applied.

FIGS. 10A to 10C are illustrations for describing the elastic member 6 and displacement of the rack shaft 8 when the steering angle is large. FIG. 10A shows a neutral state, FIGS. 10B and 10C show that the rack shaft 8 shifts in a right direction from the neutral state when a clockwise steering torque is applied.

As shown in FIGS. 9A and 9B, when the steering wheel 3 is turned counterclockwise, the rack shaft 8 shifts in a right direction in FIGS. 9A and 9B, and the elastic member 6 installed between the rack shaft 8 and the rack housing 11A is elastically deformed in accordance with shift of the rack shaft 8.

After that, as shown in FIG. 9C when the steering wheel 3 is turned counterclockwise at a steering angle not smaller than a predetermined steering angle, the elastic member 6 shifts together with the rack shaft 8 relative to the rack housing 11A, is not deformed over a predetermined deformation quantity, and a slip occurs such that the elastic member 6 relatively slips on the rack housing 11A. More specifically, until the steering wheel 3 reaches the predetermined steering angle the elastic member 6 is being deformed in accordance with the rotation of the steering wheel shaft 3a. When the steering wheel 3 reaches the predetermined steering angle, the elastic member 6 is not further deformed with a constant deformation quantity and rotates together with the rack shaft 8.

When the steering wheel torque Ts applied to the steering wheel 3 is released from this state, the elastic member 6 restores to the original state (a shape in the neutral state as shown in FIG. 9A). The restoring force is applied to the rack shaft 8, which returns the rack shaft 8 in the opposite rotation direction such that the elastic member 6 in the deformed state returns to the neutral state, so that the rack shaft 3a is returned toward the neutral state, and the steering wheel 3 is also returned toward the neutral state.

When the steering wheel 3 is turned clockwise as shown in FIGS. 10A to 10C, the steering wheel shaft 3a and the steering wheel 3 are returned toward the neutral position because of the same theory as the case where the steering wheel 3 are turned counterclockwise with a steering angel not smaller than a predetermined steering angle, and thus a detailed description is omitted.

The second embodiment as described above provides substantially the same advantageous effect as the first embodiment.

Third Embodiment

Figure 11:
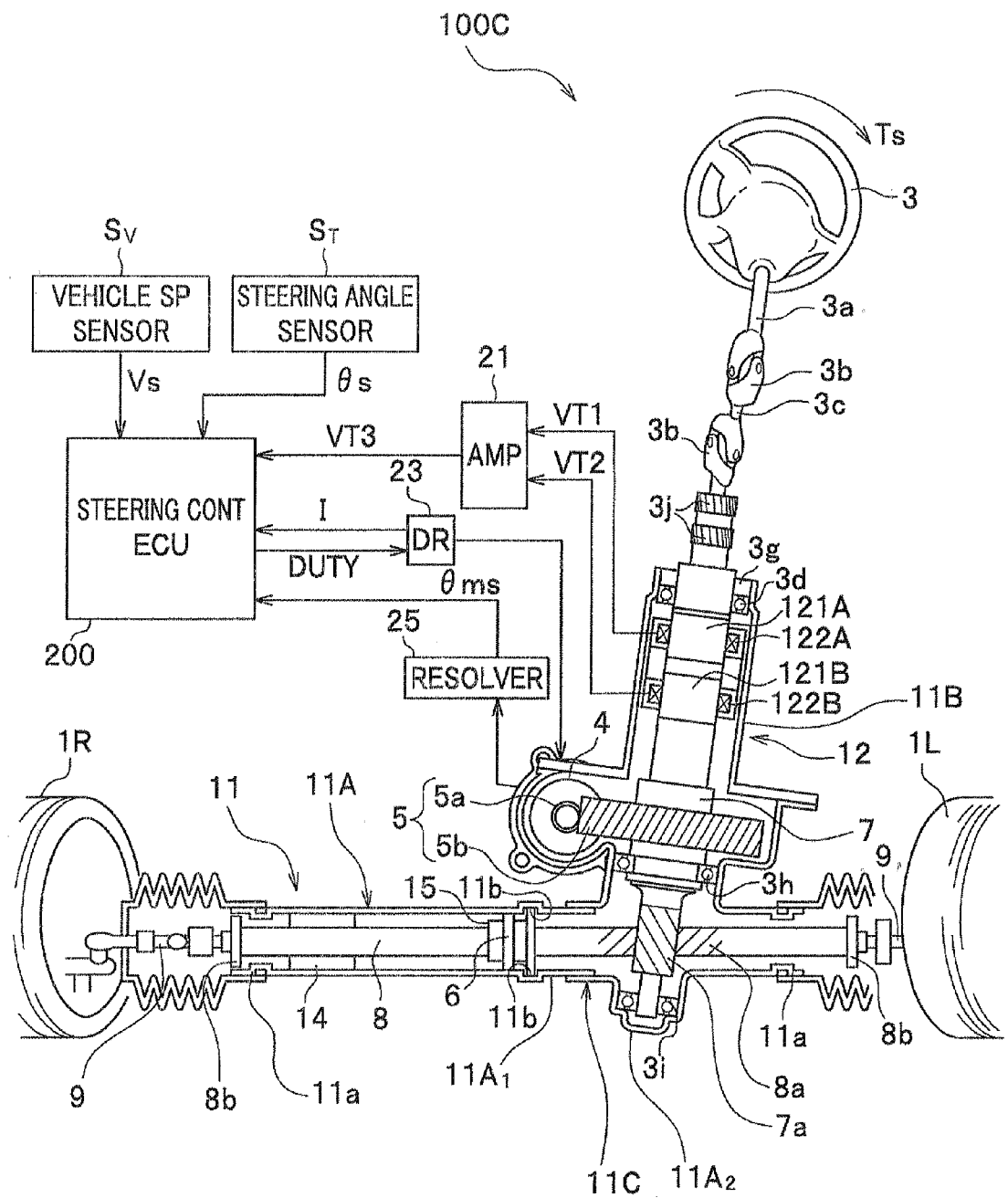
FIG. 11 is a block diagram of the electric power steering apparatus according to a third embodiment.
Figure 12A:
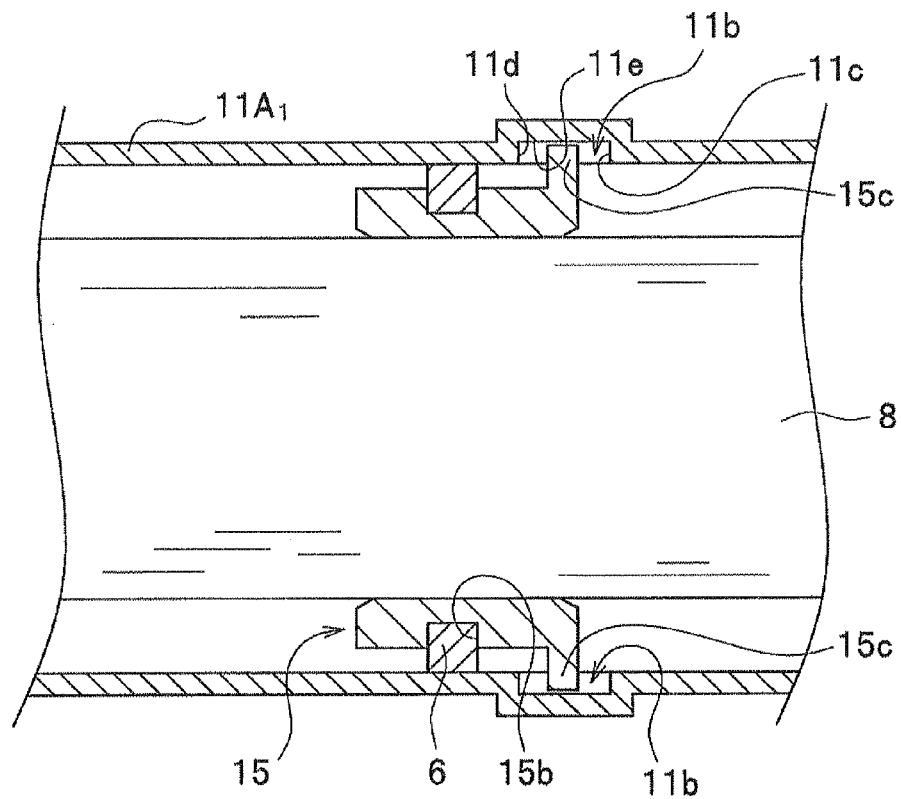
FIG. 12A is a partial enlarged cross sectional view of configuration around the elastic member and the supporting member of the electric power steering apparatus.
Figure 12B:
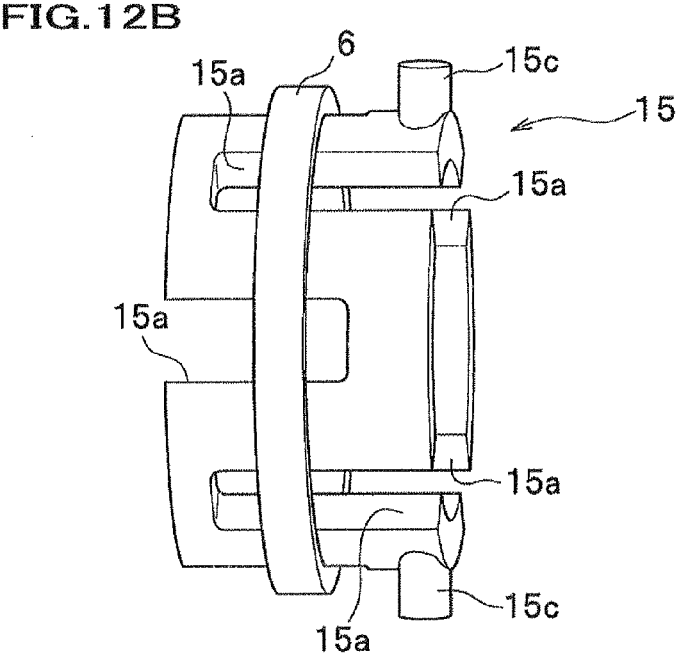
FIG. 12B is a perspective view of the elastic member and the supporting member.

With reference to FIGS. 11, 12A, and 12B will be described an electric power steering apparatus according to the third embodiment of the present invention. In the description of the third embodiment, points different from the second embodiment will be described in detail, but a duplicated description for the same parts as those in the second embodiment will be omitted.

FIG. 11 is a block diagram of an electric power steering apparatus according to a third embodiment of the present invention.

FIG. 12A is a partial enlarged cross sectional view of a configuration around the elastic member and a supporting member of the electric power steering apparatus. FIG. 12B is a perspective view of the elastic member and the supporting member.

There is a difference from the second embodiment in that the rack housing 11A is configured with two members.

There is a further difference from the second embodiment in that, a hollow part 11b is provided in the rack housing 11A.

There is another difference from the second embodiment in that the supporting member 15 is disposed between the rack shaft 8 and the elastic member 6.

As shown in FIG. 11, the rack housing 11A is configured with two members, i.e., first rack housing $11A_1$ and a second rack hosing $11A_2$. The rack housing $11A_1$ as a first housing, a steel member having a hollow sleeve shape which can house a part of the rack shaft 8. The second rack housing $11A_2$ as the second housing, installed between the first rack housing $11A_1$ and a lid part 11B, is an aluminum casting member for housing and holding a part of the rack shaft 8 and the reduction mechanism, etc. The first rack housing $11A_1$ is fixed (connected) to the second rack housing $11A_2$ as a connection part by welding in a state where end parts thereof are overlapped.

The first rack housing $11A_1$ has a plurality of hollow parts 11b, 11b around the connection part 11C of the first rack housing $11A_1$ and the second rack hosing $11A_2$.

The hollow parts 11b are formed by hollowing parts of the first rack hosing 11A₁ in a direction (up and low direction) orthogonal with an axis of the rack housing 11A₁ relative to other parts.

As shown in FIG. 12A, the hollow parts 11b are located at upper and lower parts of the first rack hosing 11A₁ in FIG. 12A one by one. The hollow parts 11b are disposed to oppose to each other and include a pair of side walls 11c and 11d extending along a direction orthogonal to the axial direction of the rack shaft 8 and a bottom 11e connecting one ends of the side walls 11c and 11d. A pair of side walls 11c, 11c function as positioning parts when the supporting member 15 is installed in the first rack housing 11A₁. More specifically, the rack shaft 8 according to the third embodiments is easily positioned in the first housing 11A₁ by that a latch 15c is inserted into the hollow part 11b.

The supporting member having a substantially sleeve shape is installed on an outer circumferential surface of the rack shaft 8 which is as a steering shaft. The supporting member 15 is a plastic member for slidably support the rack shaft 8 along an axial direction of the rack shaft 8. The supporting member 15 has a plurality of notches 15a, 15a extending in the axial direction of the rack shaft where the supporting member 15 is notched therethrough in a radial direction thereof (see FIG. 12A). The notches 15a are formed plurally in the supporting member increases an elastic potential force in the radial direction of the supporting member 15 so that contact with the outer circumferential surface of the rack shaft 8 is enhanced. Accordingly, this causes that a force moving the rack shaft (displacement force) can be easily transmitted to the rack shaft 8, so that the elastic member attached to the supporting member can be preferably deformed when the rack shaft 8 moves.

At one end, in the axial direction, of the supporting member 15 the latches (stoppers) 15c, 15c are formed. The latches 15c have a substantially columnar shape formed at the upper and lower parts of the supporting member 15 one by one. As shown in FIG. 12A, tips of the latches 15c, 15c are disposed in the hollow part 11b with predetermined clearances (gaps) to the side walls 11d and 11d. The clearances allow the supporting member 15 to move in the axial direction with a predetermined distance movement associated with movement of the rack shaft 8.

In the third embodiment, the latch 15c is formed at an end of the supporting member 15 integrally. However, it is also possible to form the latch 15c separately from the supporting member 15 and is fixed to the end, in the axial direction, of the supporting member 15.

In addition, because the supporting member 15 is a member for supporting the rack shaft 8 slidably, the supporting member 15 is preferably formed with a plastic material having a relatively low friction coefficient. However, the supporting member can be also formed with a metal material such as copper to increase stiffness. Alternatively, it is also possible to form the supporting member with a metal material and a plastic being molded on a surface of the metal. This increases stiffness with a low friction coefficient.

The elastic member is fitted on an outer circumferential surface of the supporting member 15 in a channel 15b to be disposed between the supporting member 15 and the first rack housing 11A₁.

An inner circumferential surface of the elastic member 6 abuts the outer circumferential surface of the supporting member 15 and an outer circumferential surface of the elastic member t6 abuts an inner circumferential surface of the first rack housing 11A₁. The elastic member 6 is installed between the rack shaft 8 and the rack housing 11A₁ with a suitable pressure (in a compressed state). For example, a dimension in radial direction of the rack shaft 8 of the elastic member 6 is made slightly greater than a distance between the rack shaft 8 and the rack housing 11A to provide the pressure.

In the third embodiment, it is set that a friction force F1 between the elastic member 6 and the first rack hosing 11A₁ is greater than a friction force F2 between the rack shaft 8 and the supporting member 15 (F1>F2). Accordingly, the supporting member shifts (moves) with a shift (movement) of the rack shaft 8, so that the elastic member 6 is elastically deformed with a predetermined extent and then the movement of the supporting member along the axial direction is restricted. Accordingly, because the rack shaft 8 moves in the axial direction with slidable support by the supporting member 15, so that the rack shaft 8 can stably move. Here, the status in which the elastic member 6 is elastically deformed with a predetermined extent (quantity) is that the elastic member 6 is elastically deformed such an extent that, when a rotation operation of the steering wheel 3 is changed in the rotation direction, a force returning the rack shaft 8 in the opposite direction is preferably applied to the rack shaft 8, For example, this corresponds to a status in which elastic deformation of the elastic member 6 reaches a limit (a maximum friction).

The electric power steering apparatus 100C according to the third embodiment of the present invention is basically configured as described above. Next will be described the operation and an advantageous effect.

Figure 13B:
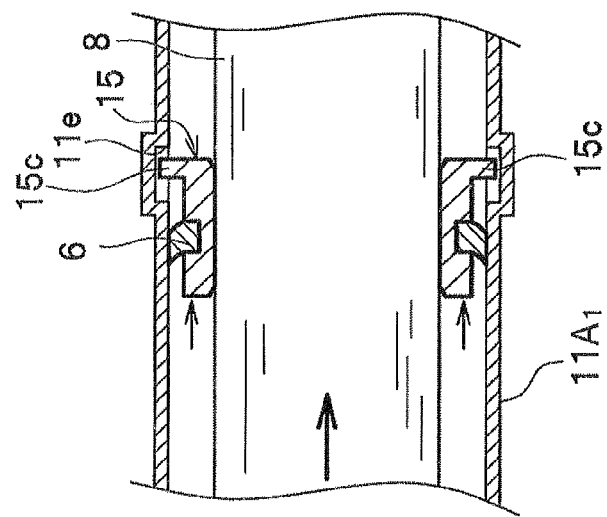
Figure 13A:
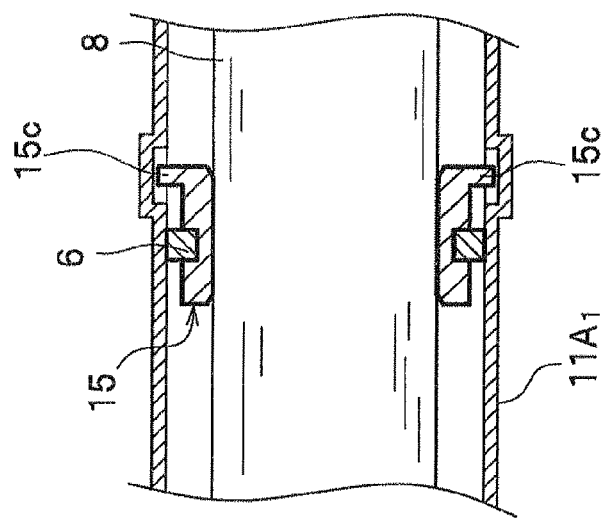
Figure 13C:
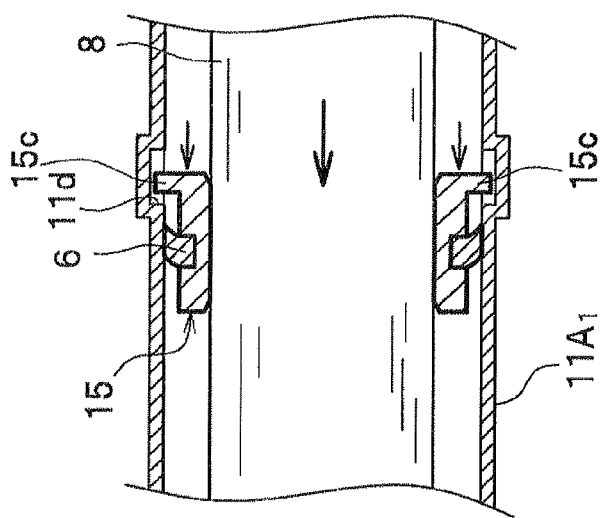

With reference to FIGS. 13A to 13C, will be described deformation of the elastic member 6 and displacement of the rack shaft 8 when the steering angle is small.

FIGS. 13A to 13C illustrate deformation of the elastic member 6 and displacement of the rack shaft 8 when the steering angle is small. FIG. 13A shows a neutral state, FIG. 13B shows a state in which the rack shaft moves in a left direction from the neutral state as a result of receiving a counterclockwise steering torque. FIG. 13C shows a state in which the rack shaft 8 is moved in a right direction from the neutral state as a result of receiving a clockwise steering torque.

As shown in FIGS. 13A and 13B, when the driver turns the steering wheel 3 (see FIG. 11) counterclockwise, the rack shaft 8 shifts in a right direction in FIGS. 13A and 13B, and the elastic member 6 disposed between the rack shaft 8 and the rack housing 11A₁ is elastically deformed in accordance with the shift of the rack shaft 8 and the supporting member 15. More specifically, because the elastic member 6 is installed between the rack shaft 8 and the rack housing 11A₁ to have the pressure, the elastic member does not move but is elastically deformed even if the rack shaft 8 shifts.

When the steering wheel torque Ts (see FIG. 11) applied to the steering wheel 3 is released in this status, the elastic member 6 restores to the original state (an original shape in the neutral state as shown in FIG. 13A). This restoring force is applied to the rack shaft 8 as a return force applied to the rack shaft 8 in an opposite direction, so that the rack shaft 8 is returned to the neutral state and the steering wheel 3 is returned to the neutral position. It is noted that the elastic member 6 and the supporting member 15 do not restrict a movement distance of the rack shaft 8.

When the steering wheel 3 is turned clockwise as shown in FIGS. 13A and 13C, the steering wheel shaft 3a and the steering wheel 3 are returned toward the neutral position because of the same operation as the case described above, and thus a detailed description is omitted. FIGS. 14A to 14E and 15A to 15E are illustrations for describing the elastic member 6 and displacement of the rack shaft 8 when the steering angle is large.

FIG. 14A shows a neutral state, and FIGS. 14B and 14C show that the rack shaft 8 shifts in a left direction from the neutral state when a counterclockwise steering torque is applied. FIGS. 14D and 14E show states in which the rack shaft 8 returns to the neutral state from the state in which the rack shaft 8 which has shifted in the left direction returns in response to release of the counterclockwise torque application.

FIGS. 15 to 15E are illustrations for describing deformation of the elastic member 6 and displacement of the rack shaft 8 when the steering angle is large. FIG. 15A shows a neutral state, FIGS. 15B and 15C show that the rack shaft 8 moves in a right direction from the neutral state when a clockwise steering torque is applied. FIGS. 15D and 15E show states in which the rack shaft 8 returns to the neutral state from the state in which the rack shaft 8 which has shifted in the right direction returns to the neutral state in response to release of the clockwise torque application.

Reference A in FIGS. 14A to 14E and 15A to 15E is a center line being orthogonal to the axial direction of the rack shaft and passing through a center point of the latch in the axial direction of the latch in the neutral state. Reference B in FIGS. 14A to 14E and 15A to 15E is a center line being orthogonal to the axial direction of the rack shaft and passing through a center point of the elastic member in the axial direction of the latch in the neutral state.

In the description below, a case where a movement of the supporting member in a state in which elastic deformation of the elastic member reach to the limit is exemplified.

As shown in FIGS. 14A and 14B, when the steering wheel 3 (see FIG. 11) is rotated counterclockwise, the elastic member 6 is elastically deformed with movement of the rack shaft while the rack shaft 8 and the supporting member 15 move in the right direction of FIGS. 14A and 14B. In other word, because the elastic member 6 is installed with pressure between the supporting member 15 and the first rack housing 11A₁, the elastic member 6 is elastically deformed.

Next, when the steering wheel 3 is rotated counterclockwise with a steering angle greater than a predetermined angle as shown in FIG. 14C. Because the friction force F1 between the elastic member 6 and the first rack housing 11A₁ is grater than the friction force F2 between the rack shaft 8 and the supporting member 15, movement of the supporting member 15 along the axial direction is restricted.

When the movement of the supporting member 15 is restricted, the rack shaft 8 moves in the axial direction with slidable support by the supporting member 15, so that the rack shift 8 moves in the right direction of FIGS. 14A to 14E stably.

Next, when the steering torque Ts (see FIG. 11) acting on the steering wheel 3 is released, as shown in FIG. 14D, the elastic member 6 restores to the original state (original shape). The restoring force is applied to the rack shaft 8 as a force returning the rack shaft 8 in the opposite direction, so that the rack shaft 8 is returned to the neutral state, which returns the steering wheel 3 to the neutral state.

When the rack shaft 8 returns to the neutral state, as shown in FIG. 14E, the elastic member 6 is elastically deformed with moving distance of the rack shaft 8 while the rack shaft 8 and the supporting member 15 moves in the left direction on FIG. 14. When the rack shaft 8 and the supporting member 15 move by a predetermined distance, the elastic member 6 is not deformed over a predetermined deformation quantity. In this state, the friction force F1 between the elastic member 6 and the first rack housing 11A is greater than the friction force F2 between the rack shaft 8 and the supporting member 15, movement of the supporting member 15 along the axial direction is restricted.

When the movement of the supporting member 15 is restricted, the rack shaft 8 moves along the axial direction with slidable support by the supporting member 15, so that the rack shaft 8 is stably returned toward the neutral state which stably returns the steering wheel 3 toward the neutral state.

When the rack shaft 8 and the steering wheel 3 return to the neutral states, the rack shaft 8 stops, and the restoring force is not applied to the supporting member 15 and the elastic member 6, so that the elastic member 6 restores and returned to the original state. Accordingly, the elastic member 6 and the supporting member 15 returned to the original positions.

In this embodiment, when the elastic member 6 reaches a limit, the latch 15c does not abut the side wall 11c of the first rack housing 11A₁, it is also possible to make the clearance between the latch 15c and the side walls 11c and 11d adjusted, so that the latch 15c abuts the side wall 11c of the first rack housing 11A₁ at the same time when the elastic deformation of the elastic member 6 reaches the limit.

When the steering wheel 3 is turned clockwise as shown in Figs. FIGS. 15A to 15E, the steering wheel shaft 3 is rotated clockwise over the predetermined angle, the operation is the same as the case described above, and thus a detailed description is omitted.

The third embodiment as described above provides substantially the same advantageous effect as the second embodiment.

According to the third embodiment, because the supporting member 15 to which the elastic member 6 is fixed moves by a predetermined distance with the movement of the rack shaft 8, Accordingly, returning of the steering wheel 3 is smoothly started by the restoring force of the elastic member 6 with a quick response. The friction force F1 between the elastic member 6 deformed to a predetermined extent and the first rack housing 11A₁ is set to be greater than the friction force F2 between the rack shaft 8 and the supporting member 15, so that after the elastic member 6 is elastically deformed, the movement of the supporting member 15 in the axial direction is restricted. Accordingly, the rack shaft 8 can move with slidable support by the supporting member 15. Accordingly the rack shaft 8 stably moves and the steering wheel 3 can be stably returned. As a result, the vehicle can be stably controlled with a quick response in steering.

According to the third embodiment, the supporting member 15 is formed with a plastic material having a relatively low friction coefficient. This secures a smooth movement (operation) of the rack shaft 8.

According to the third embodiment, the rack housing 11A is configured by connecting the first rack housing 11A₁ to the second rack housing 11A₂, as the connection part 11C. The elastic member 6 and the supporting member 15 are installed near the connection part 11C between the first rack housing 11A₁ and the second rack housing 11A₂, which makes it easier to install the elastic member 6 and the supporting member 15 in the first rack housing 11A₁ in manufacturing, so that a work efficiency for installing the elastic member 6 and supporting member 15 increases.

Figure 16:
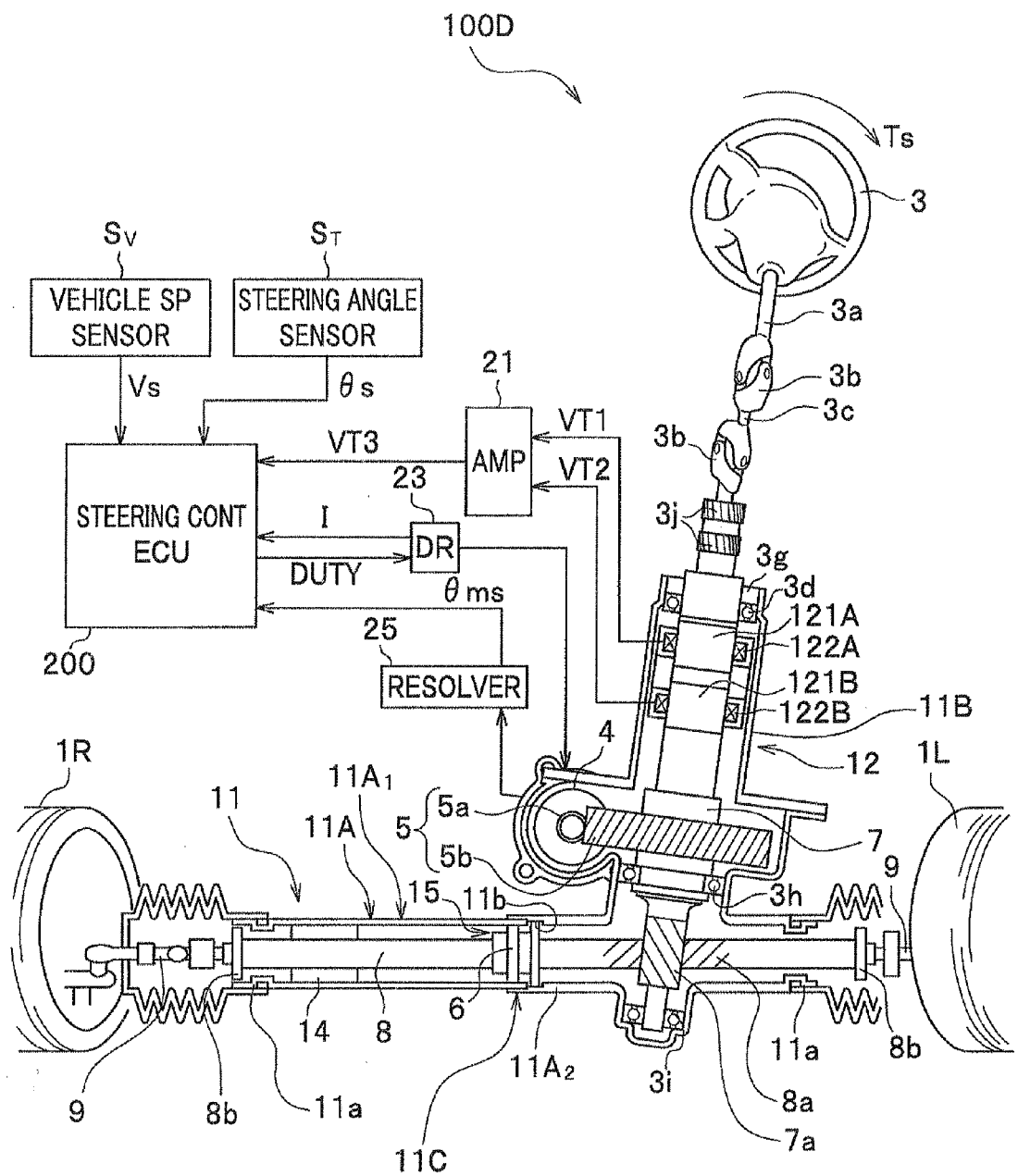
FIG. 16 shows a configuration of the electric power steering apparatus according to a third embodiment.
Figure 17A:
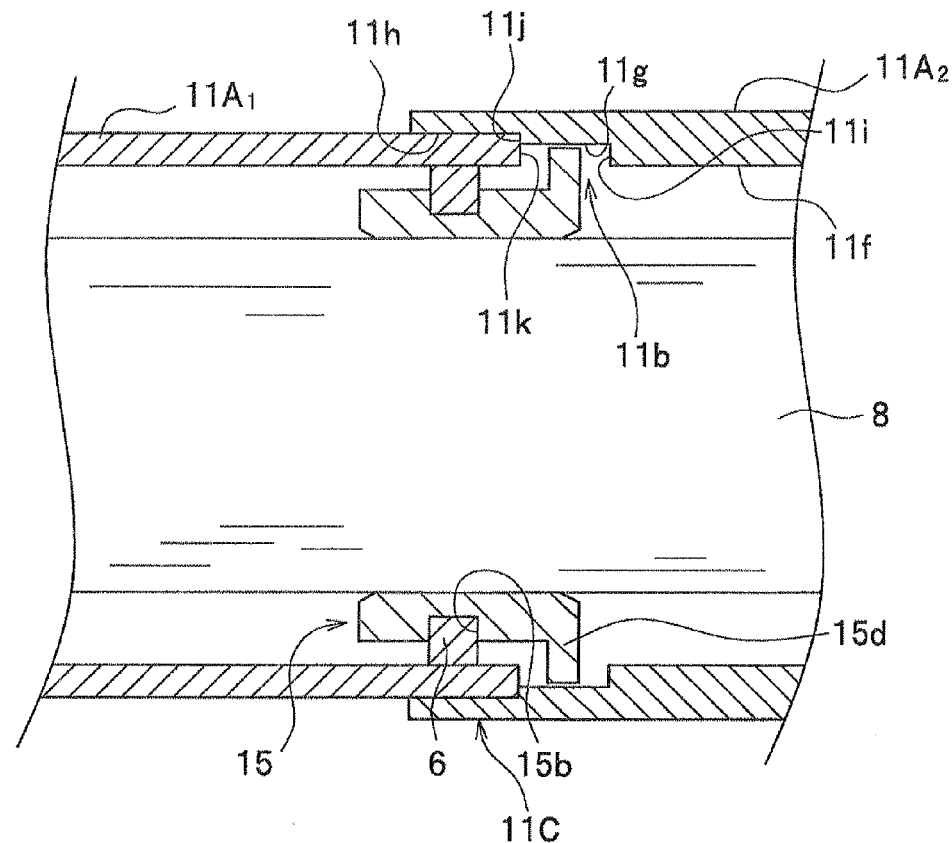
FIG. 17A is a partial enlarged longitudinal cross section view of a part of the electric power steering apparatus shown in FIG. 16 around an elastic member and a supporting member.
Figure 17B:
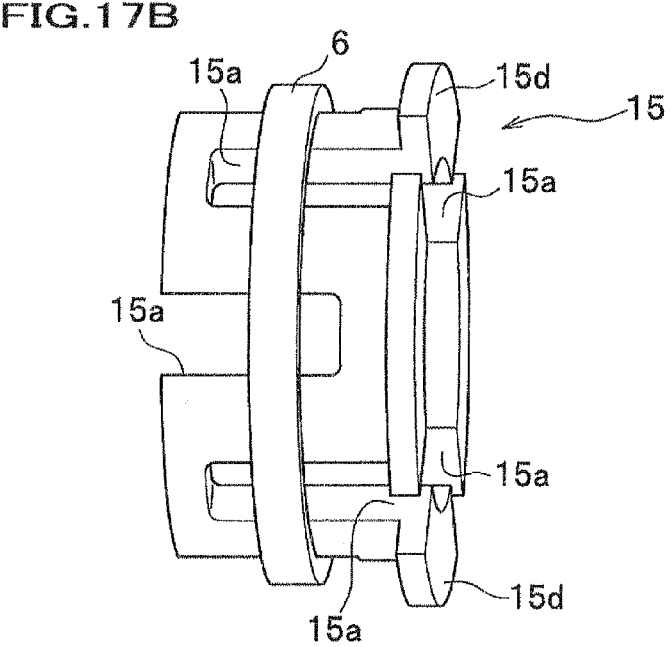
FIG. 17B is a perspective view of the elastic member and the supporting member of the electric power steering apparatus shown in FIG. 16.

Next, with reference to FIGS. 16 and 17A and 17B will be described a modification of the electric power steering apparatus of the third embodiment. In the description below, different points are mainly described in detail and the same parts and elements as those described in the third embodiment are designated with the same references and a duplicated description will be omitted FIG. 16 is a block diagram of the modification of the electric power steering apparatus 100D according to the third embodiment. FIG. 17A is a partial enlarged cross sectional view of configuration around the elastic member and the supporting member of the electric power steering apparatus 100D. FIG. 17B is a perspective view of the elastic member and the supporting member.

This modification is different from the third embodiment in configuration of the first rack housing $11A_1$ and the second rack housing $11A_2$.

In addition, the supporting member 15 in this modification is different from that in the third embodiment.

As shown in FIGS. 16 and 17A, one end of the second rack housing $11A_2$ on the lower side extends toward a side of the slide bearing 14 by a predetermined length. An inner circumferential surface of the one end of the second rack hosing $11A_2$ is enlarged in diameter thereof stepwise toward the side of the slide bearing 14.

More specifically, as shown in FIG. 17A, on the inner circumferential surface of the one end of the second rack housing $11A_2$, a small diameter surface 11f having a constant inner diameter, a middle diameter surface 11g having a constant inner diameter greater than the small diameter surface 11f, and a larger diameter surface 11h having a constant inner diameter greater than the middle diameter surface 11g, a first step wall 11i being orthogonal with the axial direction and connecting the small diameter surface 11f to the middle diameter surface 11g, and a second step wall 11j being orthogonal with the axial direction and connecting the middle diameter surface 11g to the large diameter surface 11h, disposed in the axial direction, are formed.

The first rack housing $11A_1$ and the second rack housing $11A_2$ are fixed by welding in a state where the one end surface 11k, in the axial direction, of the first rack hosing $11A_1$ abuts the second step wall 11j and an outer circumferential surface of the first rack housing abuts the larger diameter surface 11h of the first rack housing $11A_1$.

Near the connection part 11C of the first rack housing $11A_1$ and the second rack housing $11A_2$, an annular hollow part 11b is formed. The hollow part 11b is formed by being surrounded by the first step wall 11i, the middle diameter surface 11g, and the one end surface 11k in the axial direction. The first step wall 11i and the one end surface 11k serve as positioning parts in installing, in the first rack housing $11A_1$, the rack shaft 8 to which the supporting member 15 is attached. In other words, the rack shaft 8 according to this modification can be easily positioned in the first rack housing $11A_1$ by inserting a latch part 15d of the supporting ember 15 (will be described later) into the hollow part 11b.

On the outer circumferential surface of the rack shaft 8 as the steering shaft the supporting member 15 having a substantially circular sleeve shape is attached. The supporting member 15 is a plastic member for slidable supporting the rack shaft 8 in the axial direction. The supporting member 15 has a plurality of notches 15a, 15a extending in the axial direction of the rack shaft 8 where the supporting member 15 is notched therethrough in a radial direction thereof (see FIG. 17A).

At an end of the supporting member 15 a substantially annular latch 15d is formed of which diameter is enlarged than other parts by a predetermined length. An outer circumferential end of the latch 15d is disposed to have clearances in the axial direction to the first step wall 11i and the one end surface 11k in the axial direction. The clearances allow the supporting member 15 to move by a predetermined distances along the axial direction with the movement of the rack shaft 8. This allows the elastic member 6 to be elastically deformed and be restored to the original state.

In the modification of the third embodiment, the latch 15d is formed at an end of the supporting member 15 integrally. However, it is also possible to form the latch 15d separately from the supporting member 15 and is fixed to the end, in the axial direction, of the supporting member 15.

The elastic member 6 is fitted on an outer circumferential surface of the supporting member 15 in a channel 15b to be disposed between the supporting member 15 and the first rack housing $11A_1$.

An inner circumferential surface of the elastic member 6 contacts the outer circumferential surface of the supporting member 15 and an outer circumferential surface of the elastic member t6 is contacts an inner circumferential surface of the first rack housing $11A_1$. The elastic member 6 is installed between the rack shaft 8 and the rack housing 11A1 with an appropriate pressure. For example, a dimension in radial direction of the rack shaft 8 of the elastic member 6 is made slightly greater than a distance between the rack shaft 8 and the rack housing 11A to provide the pressure. The friction force F1 between the elastic member 6 deformed to a predetermined extent and the first rack housing $11A_1$ is set to be greater than the friction force F2 between the rack shaft 8 and the supporting member 15, so that after the elastic member 6 is elastically deformed, the movement of the supporting member 15 in the axial direction is restricted. Accordingly the rack shaft 8 moves along the axial direction with slidable support by the supporting member 15, so that the rack shaft 8 can stably move.

The modification as described above provides substantially the same advantageous effect as the third embodiment.

In the third embodiment and the modification, the hollow part 11b and the latches 15c, 15d are provided. However, these can be omitted.

Fourth Embodiment

Figure 20:
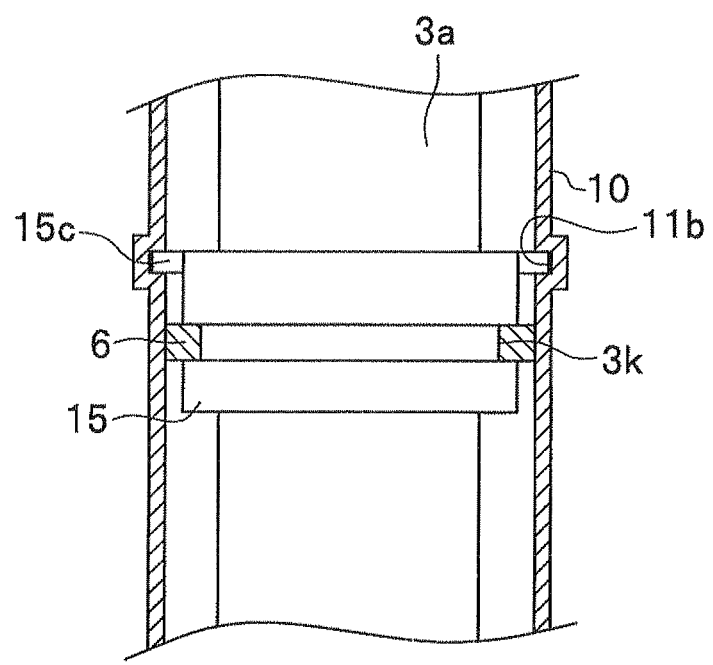
FIG. 20 is a partial enlarged longitudinal cross section view of a part of the electric power steering apparatus according to a fourth embodiment.

The configuration according to the third embodiment and the modification of the third embodiment is applicable to the steering shaft 3a. FIG. 20 is a partial enlarged longitudinal cross section view of a part of the electric power steering apparatus according to a fourth embodiment. In this case, the hollow part 11b is formed in the column housing 10. The latch 15c is inserted in the hollow part 11b with predetermined clearances in a rotation direction (not shown in FIG. 20) to provide a predetermined stroke of the latch 15c in the rotation direction. The supporting member 15 is provided between the steering shaft 3a and the elastic member 6. The elastic member 6 is fitted in a channel 3k. The operation is similar to the first to third embodiments.

The first to third embodiments (including modifications) have been described in detailed with reference to drawings. The present invention is not limited to these embodiments, but may be modified without departure of the subject of the present invention.

Figure 18:
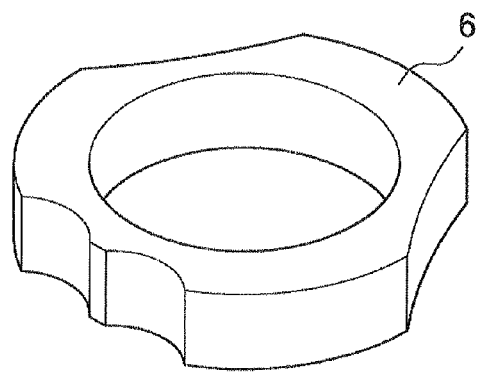
FIG. 18 is a perspective view showing a modification of the elastic member.

In the first to third embodiments, the elastic member 6 has a constant outer diameter over the whole circumference thereof. However, the present invention is not limited to this. For example, as shown in FIG. 18, the elastic member 6 is formed to have a plurality of notches in the outer circumference thereof in which the outer diameter varies to adjusts the (pressure force) acting thereon. This shape provides the elastic member of which the friction force acting thereon can be decreased, which may improve the steering feeling.

EXAMPLE

Figure 19:
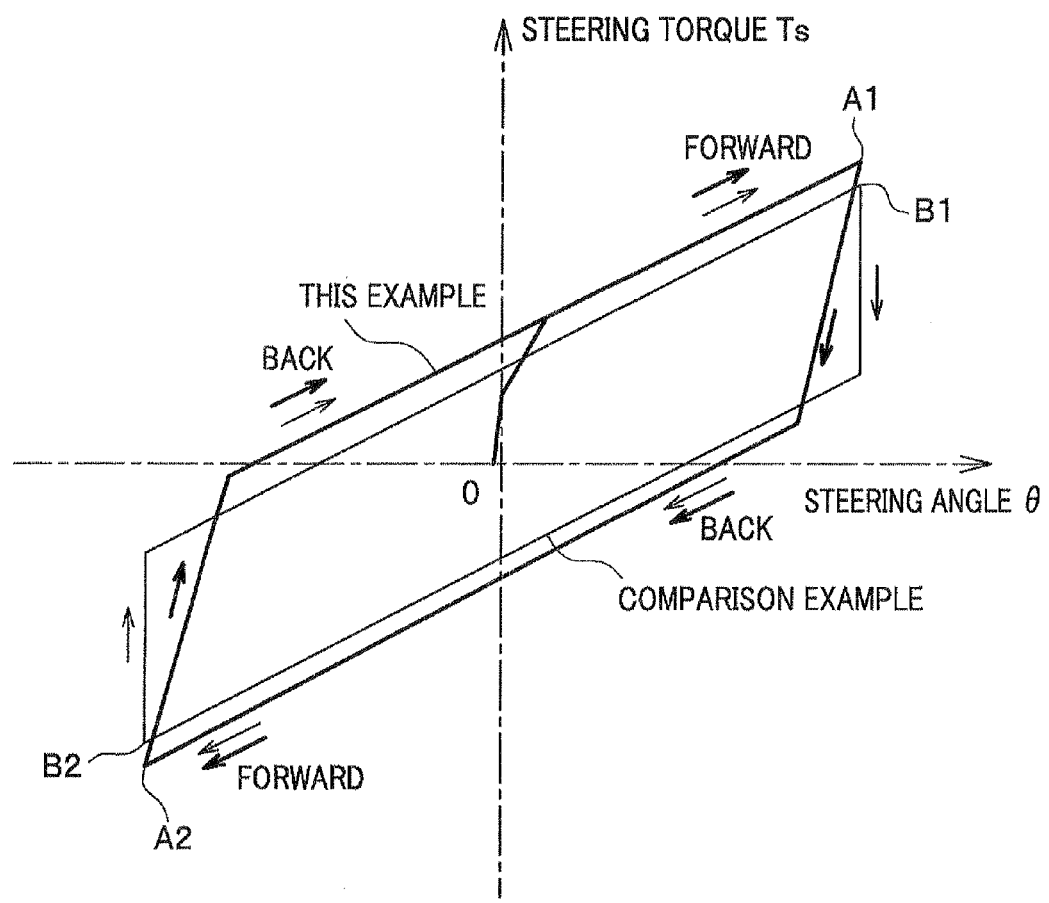
FIG. 19 illustrates Lissajous' waveforms between the steering angle and steering torque in the example and the comparative example.

With reference to FIG. 19, will be described an Example of the electric power steering apparatus according to the first and second embodiments (FIGS. 1, 5, and 11) in comparison with a comparative example having no elastic member regarding Lissajous' figure between the steering angle and steering torque.

FIG. 19 illustrates Lissajous' waveforms between the steering angle and steering torque in the example and the comparative example. In FIG. 19, the axis of abscissa represents the steering angle θ and the axis of coordinate represents the steering wheel torque Ts. The steering angle θ on the axis of abscissa increases on a side of positive values thereof with increase in a distance to the coordinate on the right side from the origin where the axis of abscissa intersects the axis of ordinate (clockwise steering). On the other hand, the steering angle θ on the axis of abscissa increases on a side of negative values thereof with increase in a distance to the coordinate on the left side from the origin (counterclockwise steering). The steering wheel torque Ts on the axis of ordinate increases on a side of positive values thereof with increase in a distance to the coordinate on the upper side from the origin. On the other hand, the steering wheel torque Ts on the axis of ordinate increases on a side of positive values thereof with increase in a distance to the coordinate on the upper side from the origin. "FORWARD" is a state in which the steering wheel 3 is turned from the neutral position (steering angle θ=0) in further direction. "BACK" is a state in which the steering wheel 3 is turned toward the neutral position (steering angle θ=0) in returning direction).

In the Example, it was confirmed that the steering angle θ is returned by a small value when the turning state of the steering wheel 3 is changed from "FORWARD" to "BACK" at turning direction switching points A1 and A2 of the steering wheel (see the solid line in FIG. 12).

On the other hand, in the Comparison Example, it was confirmed that the steering angle θ does not change when the turning state of the steering wheel 3 is changed from "FORWARD" to "BACK" (at turning direction switching points B1, see the thin line in FIG. 12) and when the turning state of the steering wheel 3 is changed from "BACK" to "FORWARD" (at turning direction switching points B2 of the steering wheel 3, see the thin line in FIG. 12).

As a result of comparison, the electric power steering apparatus having an elastic member provides a more rapid return when the turning direction of the steering wheel 3 is switched than the comparison example having no elastic member 6. In other words, it was demonstrated that installation of the elastic member 6 in the electric power steering apparatus increases a responsibility in switching of the turning direction of the steering wheel 3.

The invention claimed is:

1. An electric power steering apparatus for a vehicle, including a motor generating, in accordance with a steering torque applied to a steering wheel, an assist torque transmitted to a steering shaft, for connecting the steering wheel to a tire, comprising:
   a housing configured to house the steering shaft;
   an elastic member disposed in contact with the steering shaft and the housing and configured to be elastically deformed by contact as a result of a rotation or a displacement, in a vehicle width direction, of the steering shaft; and
   at least two bearings configured to support the steering shaft, wherein the elastic member is disposed between the bearings;
   wherein the steering shaft has an annular channel in an outer circumferential surface thereof, and wherein the elastic member is fitted into the channel.

2. The electric power steering apparatus as claimed in claim 1, wherein the elastic member has a rectangular shape on a longitudinal cross section along an axis of the steering shaft.

3. The electric power steering apparatus as claimed in claim 1, wherein the elastic member comprises a rubber member.

4. The electric power steering apparatus as claimed in claim 1, wherein the steering shaft comprises a steering wheel shaft, and the housing comprises a column housing configured to house the steering wheel shaft, and wherein the elastic member is disposed between the steering wheel shaft and the column housing.

5. The electric power steering apparatus as claimed in claim 1, wherein the steering shaft includes a torque sensor configured to detect a steering torque applied to the steering shaft, and wherein the elastic member is closer to the tire than the torque sensor.

6. The electric power steering apparatus as claimed in claim 1, wherein the steering shaft comprises a rack and pinion mechanism including a rack shaft and a pinion shaft, and the housing comprises a rack housing configured to house the rack shaft, and wherein the elastic member is disposed between the rack shaft and the rack housing.

7. The electric power steering apparatus as claimed in claim 1, further comprising a supporting member disposed between the steering shaft and the elastic member and configured to be displaced by a rotation of a predetermined angle or a predetermined distance in accordance with a rotation displacement or a displacement, in the vehicle width direction, of the steering shaft with slidable support for the steering shaft,
   wherein the elastic member is fixed to the supporting member and abuts the housing.

8. The electric power steering apparatus as claimed in claim 7, wherein the supporting member is made of a plastic material.

9. The electric power steering apparatus as claimed in claim 7, wherein the housing comprises a connection part where a first rack housing is connected to a second rack housing, and wherein
   the elastic member and the supporting member are installed near the connection part between the first rack housing and the second rack housing.

\* \* \* \* \*